US012528183B2

(12) United States Patent
Zhang et al.

(10) Patent No.: US 12,528,183 B2
(45) Date of Patent: Jan. 20, 2026

(54) ARM ANGLE INTERVAL SOLVING METHOD AND ROBOTIC ARM USING THE SAME

(71) Applicant: UBTECH ROBOTICS CORP LTD, Shenzhen (CN)

(72) Inventors: Zhihao Zhang, Shenzhen (CN); Yizhang Liu, Shenzhen (CN); Jinliang Chen, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 144 days.

(21) Appl. No.: 18/369,225

(22) Filed: Sep. 18, 2023

(65) Prior Publication Data

US 2024/0001546 A1    Jan. 4, 2024

Related U.S. Application Data

(63) Continuation of application No. PCT/CN2021/127148, filed on Oct. 28, 2021.

(30) Foreign Application Priority Data

Mar. 18, 2021   (CN) .......................... 202110290519.8

(51) Int. Cl.
*B25J 9/16*   (2006.01)

(52) U.S. Cl.
CPC ............. *B25J 9/163* (2013.01); *B25J 9/1653* (2013.01)

(58) Field of Classification Search
CPC ........ B25J 9/163; B25J 9/1653; B25J 9/1607; B25J 9/08; B25J 9/1656; B25J 9/1679;
(Continued)

(56) References Cited

U.S. PATENT DOCUMENTS

2020/0215690 A1*   7/2020   Wang ....................... B25J 9/163
2020/0331143 A1*   10/2020  Wang ..................... B25J 9/1664

FOREIGN PATENT DOCUMENTS

CN    103955619 A      7/2014
CN    106584461 A  *   4/2017  ............ B25J 9/1605

OTHER PUBLICATIONS

ISR for PCT/CN2021/127148.
(Continued)

*Primary Examiner* — Abby Lin
*Assistant Examiner* — Kayla R. Doros

(57) ABSTRACT

A robotic arm angle interval inverse solving method and a robotic arm using the same are provided. The method includes: obtaining a joint angle calculation model and a differential relationship model of a target joint of the robotic arm; obtaining extreme arm angles corresponding to a joint angle of the differential relationship model at extreme values based on the differential relationship model; obtaining a joint arm angle interval corresponding to the target joint based on the extreme arm angle and the joint angle calculation model; and obtaining a target arm angle interval corresponding to the robotic arm based on the joint arm angle interval corresponding to the target joint of the robotic arm. In comparison with the existing method to solve the arm angle interval of the robotic arm, a more accurate arm angle interval can be obtained.

20 Claims, 15 Drawing Sheets

(58) Field of Classification Search
CPC ...... B25J 17/0258; B25J 18/00; B25J 9/1643; B25J 9/1612; B25J 17/0283; B25J 17/00; B25J 17/02; G06F 30/17; G05B 2219/40367; G05B 2219/40366; G05B 2219/40362; G05B 2219/40331; G05B 2219/40369; G05B 2219/40371; G05B 2219/40373; G05B 2219/40381; G05B 2219/40382; G05B 19/18

See application file for complete search history.

(56) References Cited

OTHER PUBLICATIONS

Written opinions of ISA for PCT/CN2021/127148.
"Analytical Inverse Kinematic Computation for 7-DOF Redundant Manipulators With Joint Limits and Its Application to Redundancy Resolution", Masayuki Shimizu, "IEEE Transactions on Robotics, vol. 24, No. 5", Oct. 2008, pp. 1131-1142.

\* cited by examiner

ARM ANGLE INTERVAL SOLVING METHOD AND ROBOTIC ARM USING THE SAME

CROSS REFERENCE TO RELATED APPLICATIONS

The present disclosure is a continuation-application of International Application PCT/CN2021/127148, with an international filing date of Oct. 28, 2021, which claims foreign priority of Chinese Patent Application No. 202110290519.8, filed on Mar. 18, 2021 in the State Intellectual Property Office of China, the contents of all of which are hereby incorporated by reference.

BACKGROUND

1. Technical Field

The present disclosure relates to robot technology, and particularly to a robotic arm angle interval inverse solving method and a robotic arm using the same are provided.

2. Description of Related Art

A robotic arm (i.e., manipulator) is a complex system with high precision, multiple inputs and outputs, high nonlinearity, and strong coupling. Robotic arms have been widely used in industrial assembly, explosion-proof safety, and other fields because of their unique operational flexibility. In order to improve the human-machine collaboration performance of the robotic arms and their ability to perform complex tasks, the 7-DOF (seven-degree-of-freedom) robotic arms with added redundancy has gradually become the focus of research in the robotics industry.

At present, the inverse kinematics solving methods of robotic arms mainly include numerical solving and analytical solving methods. The numerical solving obtains required data by using Jacobian to perform iterative calculations, while its calculation process is easily troubled by errors and singularities which cause the inaccuracy of the arm angle intervals of the robotic arm using the inverse solving method. The analytical solving is only applicable to the inverse solution of the robotic arms with 6-DOF (six-degree-of-freedom) or less, and have more parsing difficulty for the 7-DOF robotic arms with redundancy.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
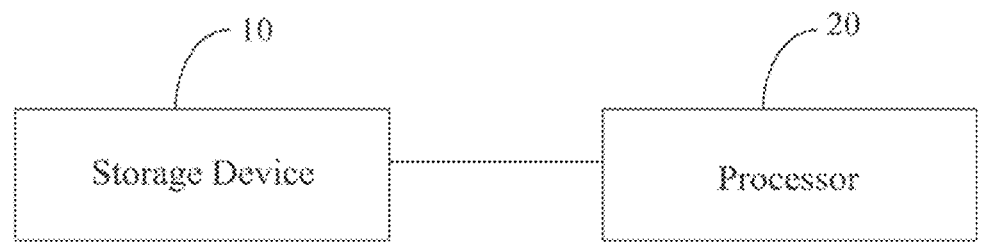
FIG. 1 is a schematic diagram of an application scenario of a robotic arm angle interval inverse solving method according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

In addition, in the specification and the claims of the present disclosure, the terms "first", "second", "third", and the like in the descriptions are only used for distinguishing, and cannot be understood as indicating or implying relative importance.

References such as "one embodiment" and "some embodiments" in the specification of the present disclosure mean that the particular features, structures or characteristics described in combination with the embodiment(s) are included in one or more embodiments of the present disclosure. Therefore, the sentences "in one embodiment," "in some embodiments," "in other embodiments," "in still other embodiments," and the like in different places of this specification are not necessarily all refer to the same embodiment, but mean "one or more but not all embodiments" unless specifically emphasized otherwise. The terms "comprising", "including", "having" and their variants mean "including but not limited to" unless specifically emphasized otherwise.

In comparison with the commonly used 6-DOF robotic arms that have a wider range of motion, because the 7-DOF robotic arms can perform more complex motions, the research on them have become the trend currently. Since a 7-DOF robotic arm may also be called a redundant manipulator, to calculate the arm angle interval of the robotic arm is to calculate the redundant interval of the robotic arm.

In the present disclosure, it mainly solves the arm angle interval of a 7-DOF robotic arm having a plurality of joints and an end (i.e., end effector), where the joints has limits and an elbow joint among the joints has offset. In which, the elbow joint is the fourth joint (joint 4 hereinafter) of the robotic arm. The arm angle interval of the robotic arm is solved using an inverse solving method, where the so-called inverse solving refers to solving the motion parameters of each joint of the robotic arm while the pose (i.e., position and posture) of the end of the robotic arm is known and remains unchanged.

FIG. 1 is a schematic diagram of an application scenario of a robotic arm angle interval inverse solving method according to an embodiment of the present disclosure. The above-mentioned robotic arm angle interval inverse solving method may be used to solve the arm angle interval of the robotic arm. A storage device 10 of, for example, a controller of the robotic arm, is configured to store a joint angle calculation model and a differential relationship model of a target joint of the robotic arm, and a processor 20 of, for example, the controller of the robotic arm, is configured to obtain the joint angle calculation model and the differential relationship model from the storage device 10 so as to calculate the arm angle interval of the robotic arm based on the joint angle calculation model and the differential relationship model.

In this embodiment, the inverse solving method for the arm angle interval of the robotic arm will be described in detail below with reference to FIG. 1

Figure 2:
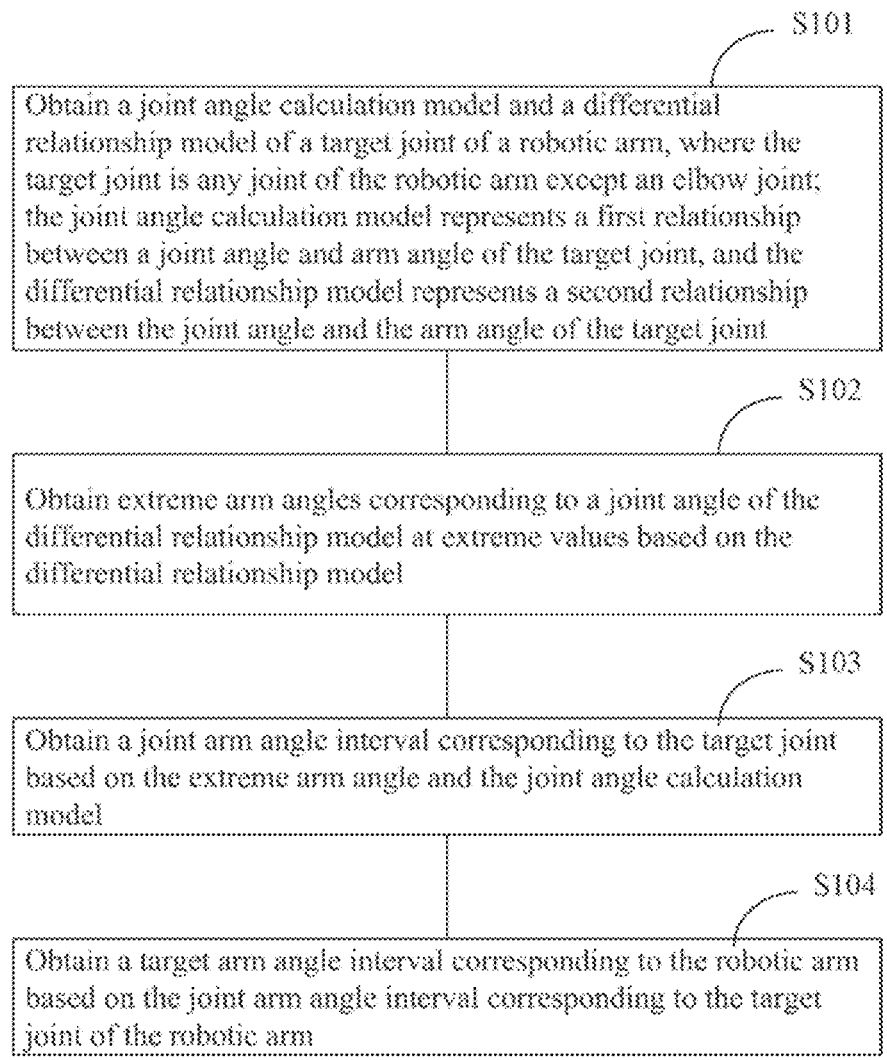
FIG. 2 is a flow chart of the robotic arm angle interval inverse solving method of FIG. 1.

FIG. 2 is a flow chart of the robotic arm angle interval inverse solving method of FIG. 1. In this embodiment, a computer-implemented method for solving the arm angle interval of the robotic arm in inverse solving manner is provided, so that angles of the joints of the robotic arm can be calculated based on arm angles in the solved arm angle interval, thereby controlling, according to the calculated angles, the corresponding joint of the robotic arm to rotate so as to move the robotic arm. The robotic arm angle interval inverse solving method may be applied on the processor 20 shown in FIG. 1. In other embodiments, the method may be implemented through a robotic arm angle interval inverse solving apparatus shown in FIG. 14, or a robotic arm shown in FIG. 15. As shown in FIG. 2, in this embodiment, the robotic arm angle interval inverse solving method may include the following steps.

S101: obtaining a joint angle calculation model and a differential relationship model of a target joint of the robotic arm, where the target joint is any joint of the robotic arm except the elbow joint; the joint angle calculation model represents a first relationship between a joint angle and arm angle of the target joint, the differential relationship model represents a second relationship between the joint angle and the arm angle of the target joint; and the arm angle of the target joint is an included angle between a plane formed by each joint of the robotic arm and a reference plane.

In this embodiment, the joints in the robotic arm from the shoulder joint to the end of the robotic arm may include joint 1 (i.e., the first joint), joint 2 (i.e., the second joint), joint 3 (i.e., the third joint), joint 4 (i.e., the fourth joint), joint 5 (i.e., the fifth joint), joint 6 (i.e., the sixth joint), and joint 7 (i.e., the seventh joint). In which, joints 1 and 2 correspond to the shoulder joint, joint 3 corresponds to a rotating joint of the upper arm, joint 4 corresponds to the elbow joint, joint 5 corresponds to a rotating joint of the lower arm, and joints 6 and 7 correspond to the wrist joint.

As an example, the calculation models of joint angles may have two types: one is tan type and the other is sin type.

When the target joint is joint 1, joint 3, joint 5, or joint 7 of the robotic arm, the joint angle calculation model may be as an equation of:

$$\tan\theta_i = \frac{a_{ni}\sin\psi + b_{ni}\cos\psi + c_{ni}}{a_{di}\sin\psi + b_{di}\cos\psi + c_{di}};$$

where, $\theta_i$ is the joint angle of the i-th joint, i is one of 1, 3, 5 and 7, $a_{ni}$, $b_{ni}$, $c_{ni}$, $a_{di}$, $b_{di}$ and $c_{di}$ are coefficients in the joint angle calculation model that corresponds to the i-th joint, and $\psi$ is the arm angle.

When the target joint is joint 2 or joint 6 of the robotic arm, the joint angle calculation model may be as an equation of:

$$\sin\theta_j = a_j \sin\psi + b_j \cos\psi + c_j;$$

where $\theta_j$ is the joint angle of the j-th joint, j is one of 2 and 6, $a_j$, $b_j$, and $c_j$ are coefficients in the joint angle calculation model that correspond to the j-th joint, and $\psi$ is the arm angle.

The differential relationship model is obtained by differentiating through the joint angle calculation model. Since there are two types of joint angle calculation model, there are also two types of differential relationship model.

When the target joint is joint 1, joint 3, joint 5, or joint 7 of the robotic arm, the differential relationship model may be as an equation of:

$$f_i(\psi) = \frac{d\theta_i}{d\psi} = \frac{a_{ti}\sin\psi + b_{ti}\cos\psi + c_{ti}}{f_{ni}^2(\psi) + f_{di}^2(\psi)};$$

where, $\theta_i$ is the joint angle of the i-th joint, i is one of 1, 3, 5 and 7, $a_{ti}$, $b_{ti}$ and $c_{ti}$ are coefficients in the differential relationship model that correspond to the i-th joint, and $\psi$ is the arm angle, $a_{ti}=b_{di}\times c_{ni}-b_{ni}\times c_{di}$, $b_{ti}=a_{ni}\times c_{di}-a_{di}\times c_{ni}$, $c_{ti}=a_{ni}\times b_{di}-a_{di}\times b_{ni}$, $f_{ni}(\psi)=a_{ni}\sin\psi+b_{ni}\cos\psi+c_{ni}$, $f_{di}(\psi)=a_{di}\sin\psi+b_{di}\cos\psi+c_{di}$; and When the target joint is joint 2 or joint 6 of the robotic arm, the differential relationship model may be as an equation of:

$$f_j(\psi) = \frac{d\theta_j}{d\psi} = \frac{1}{\cos\theta_j}(a_j\cos\psi - b_j - \sin\psi);$$

where $\theta_j$ is the joint angle of the j-th joint, j is one of 2 and 6, $a_j$, $b_j$ and $c_j$ are coefficients in the joint angle calculation model that correspond to the j-th joint, and $\psi$ is the arm angle.

In this embodiment, the rotation axes of joint 1, joint 2 and joint 3 may be regarded as one point to denote as point 1, and the rotation axes of joint 5, joint 6 and joint 7 may be regarded as one point to denote as point 2. Then, point 1, point 2 and joint 4 may form a plane to denote as an arm angle plane. It can be obtained that the arm angle is the included angle between the arm angle plane and a preset reference plane.

Figure 3:
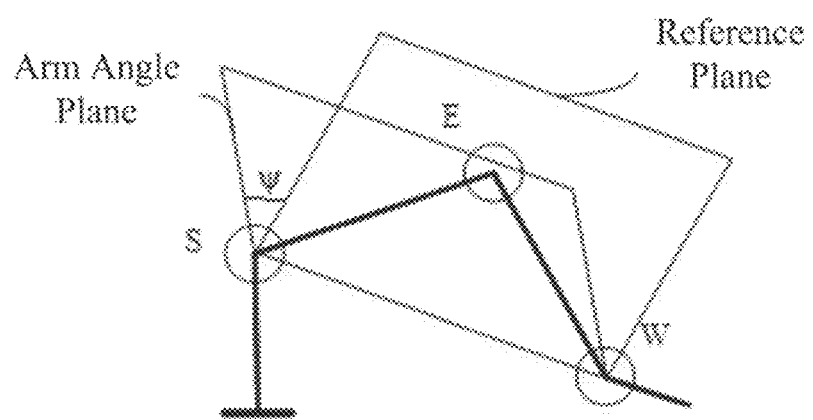
FIG. 3 is a schematic diagram of an arm angle plane and a reference plane according to an embodiment of the present disclosure.

FIG. 3 is a schematic diagram of the arm angle plane and the reference plane according to an embodiment of the present disclosure. As shown in FIG. 3, as an example, point S is point 1 where the rotation axes of joint 1, joint 2 and joint 3 intersect, and point W is point 2 where the rotation axes of joint 5, joint 6 and joint 7 intersect. Point E represents a point of joint 4. The arm angle plane is a plane composed of points S, point W and point E. The reference plane and the arm angle plane intersect on a straight line S-W. The arm angle is angle $\psi$. The arm angle interval is the angle that the arm angle plane can rotate around point W when the pose of the end of the robot arm remains unchanged.

S102: obtaining extreme arm angles corresponding to a joint angle of the differential relationship model at extreme values based on the differential relationship model, where the extreme arm angles include an arm angle corresponding to the joint angle of the differential relationship model at a maximum value and an arm angle corresponding to the joint angle of the differential relationship model at a minimum value.

In this embodiment, the differential relationship model is used to represent the differential relationship of the joint angle of the target joint with respect to the arm angle of the target joint. The value of the joint angle corresponding to each arm angle is obtained by inputting different arm angles into the differential relationship model. The maximum and minimum values are obtained from the values of the joint angles in the differential relationship model, and then the extreme arm angles are determined.

Figure 4:
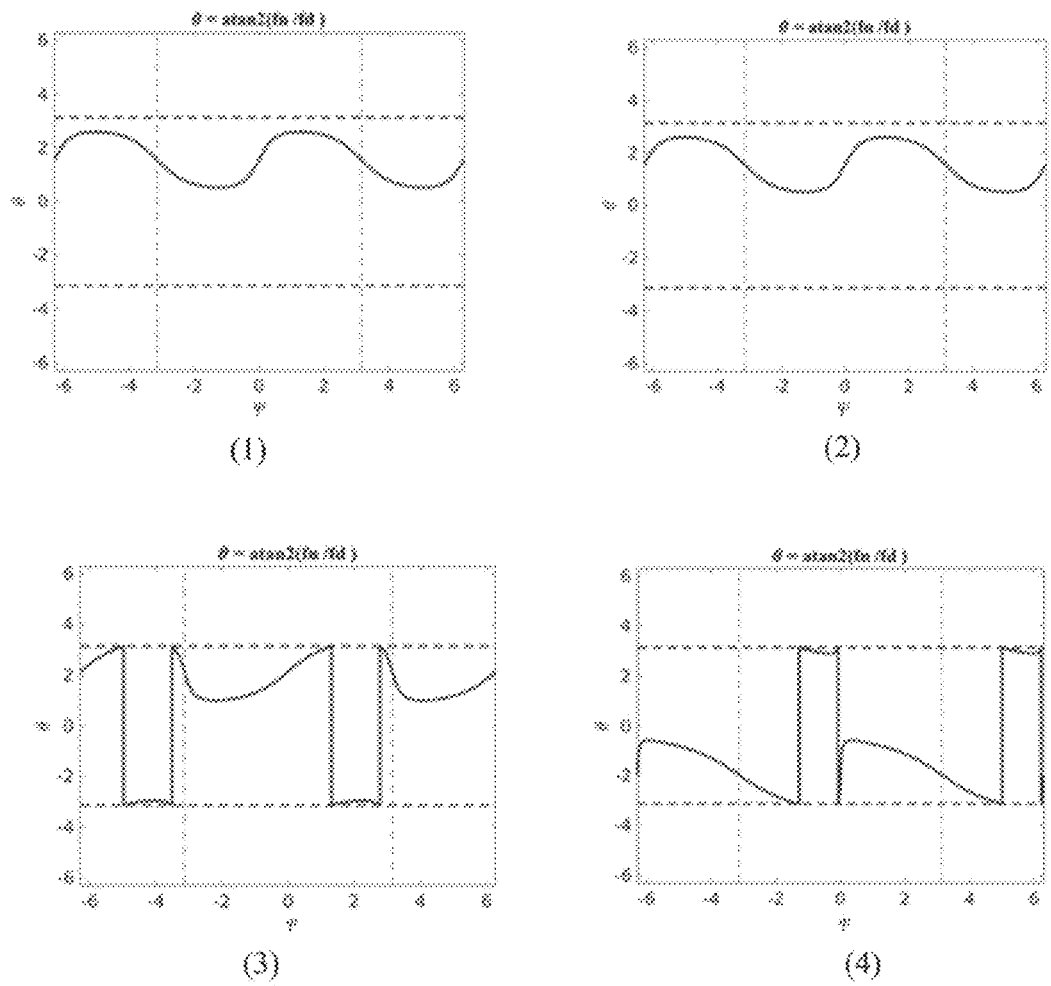
FIG. 4 is a schematic diagram of the change of a joint angle with an arm angle in tan type according to a first embodiment of the present disclosure.
Figure 5:
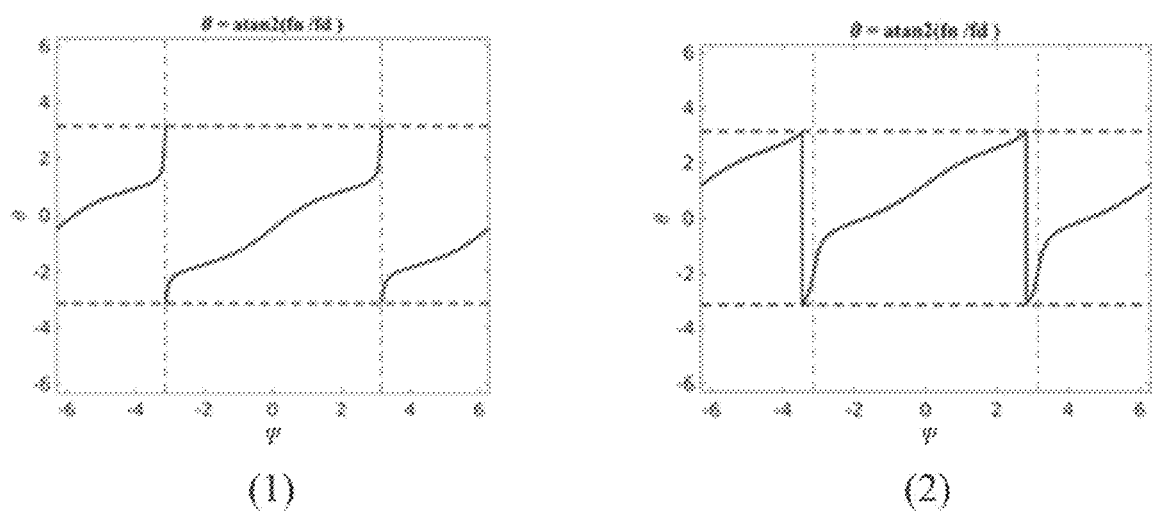
FIG. 5 is a schematic diagram of the change of the joint angle with the arm angle in tan type according to a second embodiment of the present disclosure.
Figure 6:
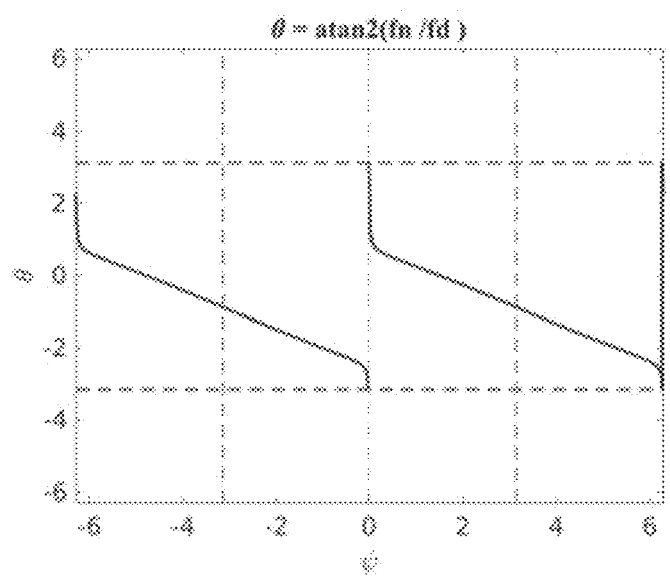
FIG. 6 is a schematic diagram of the change of the joint angle with the arm angle in tan type according to a third embodiment of the present disclosure.
Figure 7:
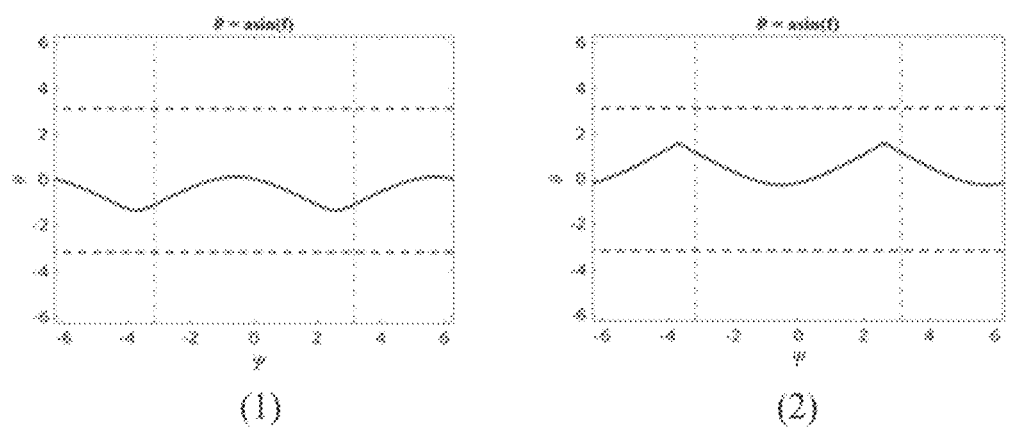
FIG. 7 is a schematic diagram of the change of the joint angle with an arm angle in sin type according to an embodiment of the present disclosure.

As an example, diagrams of the change of the value of the differential relationship model with the arm angle may be established, and the extreme arm angles may be determined from the diagrams of the change. FIG. 4 is a schematic diagram of the change of a joint angle with an arm angle in tan type according to a first embodiment of the present disclosure; FIG. 5 is a schematic diagram of the change of the joint angle with the arm angle in tan type according to a second embodiment of the present disclosure; FIG. 6 is a schematic diagram of the change of the joint angle with the arm angle in tan type according to a third embodiment of the present disclosure; and FIG. 7 is a schematic diagram of the change of the joint angle with an arm angle in sin type according to an embodiment of the present disclosure. As shown in FIGS. 4-7, in the diagrams of the change between the joint angle and the arm angle that are obtained from the differential relationship model, the abscissa is the change of the arm angle, and the ordinate is the value of the change of the joint angle with the change of the arm angle. FIGS. 4-6 show the changing relationships between the arm angle and the joint angle that are in the differential relationship model corresponding to joints 1, 3, 5 and 7; and FIG. 7 shows the differential relationships between the arm angle and the joint angle that are in the differential relationship model corresponding to joints 2 and 6.

In this embodiment, since the extreme arm angles are the corresponding arm angle when the differential relationship model is at the maximum value and that when the differential relationship model is at the minimum value, the extreme arm angles include a maximum arm angle and a minimum arm angle.

S103: obtaining a joint arm angle interval corresponding to the target joint based on the extreme arm angle and the joint angle calculation model.

In this embodiment, firstly, the maximum joint angle of the target joint may be obtained based on the maximum arm angle in the extreme arm angles; and the minimum joint angle of the target joint may be obtained based on the minimum arm angle in the extreme arm angles. Then, the joint arm angle interval of the target joint may be inversely solved based on the maximum joint angle and the minimum joint angle.

In one embodiment, step S103 may include the following sub-steps.

S1031: obtaining a candidate joint angle of the target joint based on the extreme arm angle and the joint angle calculation model, where the candidate joint angle includes a maximum candidate joint angle and a minimum candidate joint angle.

In this embodiment, the maximum joint angle may be obtained to denote as the maximum candidate joint angle by inputting the maximum arm angle in the extreme arm angles into the joint angle calculation model, and the minimum joint angle may be obtained to denote as the minimum candidate joint angle by inputting the minimum arm angle in the extreme arm angles into the joint angle calculation model.

S1032: obtaining a joint arm angle interval corresponding to the target joint based on the candidate joint angle and the joint angle calculation model.

In this embodiment, each of the maximum candidate joint angle and the minimum candidate joint angle are input into the joint angle calculation model to inversely solve the joint arm angle interval corresponding to the target joint.

S104: obtaining a target arm angle interval corresponding to the robotic arm based on the joint arm angle interval corresponding to the target joint of the robotic arm.

In this embodiment, after obtaining, through inverse solving, the joint arm angle interval corresponding to the target joint, the target arm angle interval may be obtained by calculating the intersection of the joint arm angle interval corresponding to joint 1, that corresponding to joint 2, that to joint 3, that corresponding to joint 5, that corresponding to joint 6, and that corresponding to joint 7.

In this embodiment, it first obtains a joint angle calculation model and a differential relationship model of a target joint of the robotic arm, where the target joint is any joint of the robotic arm except the elbow joint; obtains extreme arm angles corresponding to a joint angle of the differential relationship model at extreme values based on the differential relationship model, where the extreme arm angles include an arm angle corresponding to the joint angle of the differential relationship model at a maximum value and an arm angle corresponding to the joint angle of the differential relationship model at a minimum value; obtains a joint arm angle interval corresponding to the target joint based on the extreme arm angle and the joint angle calculation model; and finally obtains a target arm angle interval corresponding to the robotic arm based on the joint arm angle interval corresponding to the target joint of the robotic arm. By first obtaining the extreme arm angles when the differential relationship model is at the extreme values, then obtaining the joint arm angle interval corresponding to each target joint based on the extreme arm angles, and finally obtaining the arm angle interval of the robotic arm based on the joint arm angle interval of each target joint, a more accurate arm angle interval in comparison with the existing method to solve the arm angle interval of the robotic arm can be obtained.

In one embodiment, step S101 may include:
establishing a DH coordinate system of each joint of the robotic arm;
obtaining a rotational angle of joint 4 based on the DH coordinate system of each joint and the pose of the end of the robotic arm;
calculating the joint angle of joint 1 and the joint angle of joint 2 in response to joint 3 being 0, where the value of 0 for joint 3 means that joint 3 is stationary;
obtaining the joint angle calculation model based on the joint angle of joint 1, the joint angle of joint 2, the rotational angle of joint 4 and Rodrigues' formula; and
obtaining the differential relationship model by differentiating the joint angle calculation model.

Figure 8:
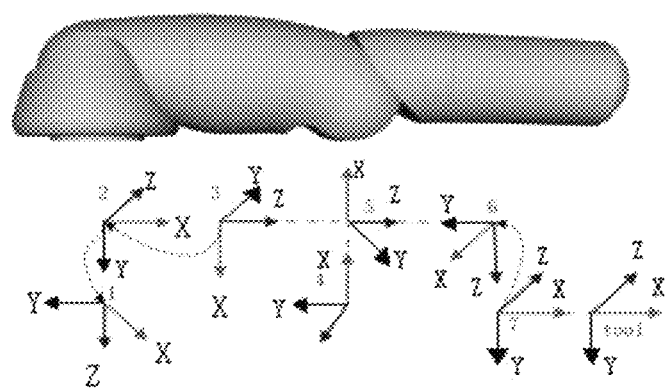
FIG. 8 is a schematic diagram of the structure of a 7-DOF robotic arm with elbow joint limit according to an embodiment of the present disclosure.

FIG. 8 is a schematic diagram of the structure of a 7-DOF robotic arm with elbow joint limit according to an embodiment of the present disclosure. As shown in FIG. 8, DH coordinate systems are established for the seven joints of the robotic arm, where the coordinate systems connected by the dotted line represents that the origins of the axes of the two joints coincide with one point, and the chain line indicates that there is a positional offset on the coordinate axis on which the chain line is located.

The distance between joints 3 and 5 is set to lse, the distance between joints 4 and 5 is set to d, and the distance between joints 5 and 6 is set to lew.

Figure 9:
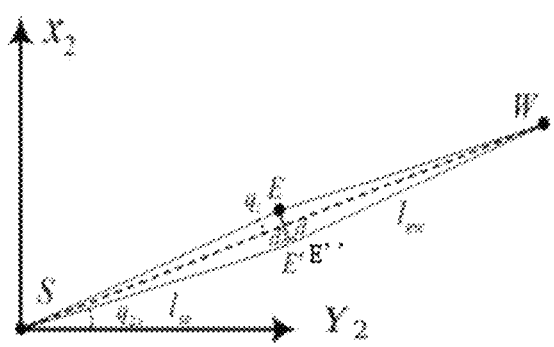
FIG. 9 is a schematic diagram of the structure obtained by projecting the origin of each joint onto the DH coordinate system of joint 2 according to an embodiment of the present disclosure.

When calculating the rotational angle of joint 4, the DH coordinate system of joint 2 may be used as the reference coordinate system. It can be obtained from the various DH coordinates established in FIG. 8 that, the origin of joint 2, that of joint 5, and that of joint 4 form a right-angled triangle to denote as the right-angled triangle formed by the upper arm of the robotic arm; and the origin of joint 4, that of joint 5, and that of joint 6 form another right-angled triangle to denote as the right-angled triangle formed by the lower arm of the robotic arm. FIG. 9 is a schematic diagram of the structure obtained by projecting the origin of each joint onto the DH coordinate system of joint 2 according to an embodiment of the present disclosure; and FIG. 10 is a schematic diagram of the structure obtained by projecting the origin of each joint onto the DH coordinate system of joint 2 according to another embodiment of the present disclosure.

Figure 10:
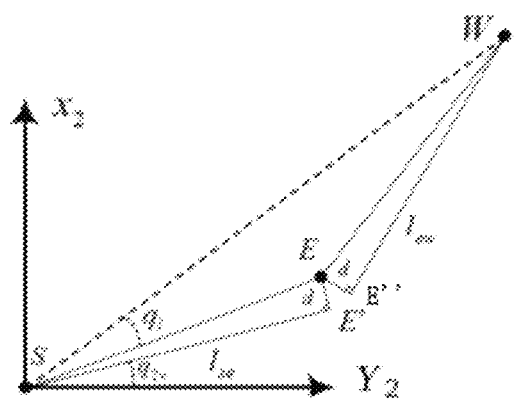
FIG. 10 is a schematic diagram of the structure obtained by projecting the origin of each joint onto the DH coordinate system of joint 2 according to another embodiment of the present disclosure.

As shown in FIGS. 9 and 10, the right-angled triangle formed by the upper arm, the right-angled triangle formed by the lower arm, and points S, E and W in FIG. 3 are projected into the DH coordinate system of joint 2, while joint 4 has an offset, the coordinate system as shown in FIG. 9 and FIG. 10 is obtained, where the rotational angles of joint 4 may include two angles. In which, the triangle formed by triangle SEE' is the triangle formed by the upper arm, and the triangle formed by triangle WEE" is the triangle formed by the lower arm. In FIG. 9 and FIG. 10, ∠E'EE" are the rotational angles of joint 4.

As shown in FIG. 9, the rotational angle of joint 4 may be $q_4 = -(\angle SEW - \angle SEE' - \angle WEE')$ As shown in FIG. 10, the rotational angle of joint 4 may be $q_4 = \angle SEW + \angle SEE' + \angle WEE'' - \pi$.

After calculating the rotational angle of joint 4, joint 3 may be assumed to be 0, that is, the 7-DOF robotic arm may be taken as the 6-DOF robotic arm for calculation.

As shown in FIG. 9 and FIG. 10, it can be seen that the joint angles of joint 2 may be $$q_2^0 = \angle WSZ + q_l - \angle ESE' \text{ and } q_2^0 = \angle WSZ - q_l - \angle ESE',$$

where $$q_i = a\cos\left(\frac{l_{se}^2 + l_{sw}^2 + l_{ew}^2}{2l_{se}l_{sw}}\right),$$

lsw is the distance between the wrist joint and the shoulder joint, where the wrist joint corresponds to joints 6 and 7, and the shoulder joint corresponds to joints 1, 2 and 3. The joint angle of joint 1 is $$q_1^0 = \arctan\frac{Y_{2w}}{x_{2w}} + \frac{\pi}{2},$$

where $Y_{2w}$ is the projected value of point W onto coordinate axis $Y_2$, and $x_{2w}$ is the projected value of point W onto coordinate axis $x_2$.

According to Rodrigues' formula, the redundant motion of the robotic arm may be regarded as a rotation of y degrees around the axis lsw. Therefore, Rodrigues' formula may be expressed as an equation of:

$$R_\psi^0 = I + \sin\psi[\text{skew}(u_{sw})] + (1 - \cos\psi)[\text{skew}(u_{sw})]^2;$$

where, I is the unit diagonal matrix, $u_{sw}$ is the normalized position vector matrix of the end of the robotic arm, and skew($u_{sw}$) is a 3×3 matrix.

According to Rodrigues' formula, when joint 3 is 0, the rotational matrices of joint 1, joint 2 and joint 3 may be $$R_3^0 = R_\psi^0 R_{o3}^0 = A_s \sin\psi + B_s \cos\psi + C_s R_{o3}^0$$

may include $q_2^0$ and $q_1^0$; and $A_s$, $B_s$ and $C_s$ are three matrices.

According to Rodrigues' formula, when joint 3 is 0, the rotational matrix of joint 4, joint 5, joint 6 and joint 7 may be $$R_7^4 = R_3^0 R_4^3 R_7^5 = A_w \sin\psi + B_w \cos\psi + C_w, R_4^3 \text{ is } q_4, R_7^5$$

includes three unknowns namely the joint angle of joint 5, the joint angle of joint 6 and the joint angle of joint 7, and $A_w$, $B_w$, and $C_w$ are three matrices.

Through the above-mentioned formula $$R_3^0 = R_\psi^0 R_{o3}^0 = A_s \sin\psi + B_s \cos\psi + C_s,$$

it may obtain the values in the three matrices $A_s$, $B_s$ and $C_s$, and three matrices $A_w$, $B_w$ and $C_w$ may be obtained through $$R_3^0 = R_\psi^0 R_{o3}^0 = A_s \sin\psi + B_s \cos\psi + C_s.$$

Therefore, it may be obtained that $$R_3^0 = \begin{bmatrix} * & -\cos q_2 \times \sin q_1 & * \\ * & \cos q_1 \times \sin q_2 & * \\ -\cos q_2 \times \cos q_3 & -\sin q_2 & \cos q_2 \times \sin q_3 \end{bmatrix};$$

and $$R_7^4 = \begin{bmatrix} * & * & \cos q_6 \times \sin q_5 \\ * & * & -\cos q_5 \times \sin q_6 \\ \cos q_6 \times \cos q_7 & -\cos q_6 \times \sin q_7 & \sin q_6 \end{bmatrix};$$

where * is used to replace the value of the corresponding position in the matrix. Since the position is not used in deriving the calculation model of the joint angle, the value of the position is not expressed specifically and may be replaced using the sign *.

Therefore, the joint angle calculation model of joint 1 may be obtained as an equation of $$\tan\theta_1 = \frac{-a_{s12}\sin\psi - b_{s12}\cos\psi - c_{s12}}{a_{s22}\sin\psi + b_{s22}\cos\psi + c_{s22}},$$

where $\theta_1$ is the joint angle of joint 1, $a_{s12}$ is the value in row 1 and column 2 of $A_s$, $a_{s22}$ is the value in row 2 and column 2 of $A_s$, $b_{s12}$ is the value in row 1 and column 2 of $B_s$, $b_{s22}$ is the value in row 2 and column 2 of $B_s$, $c_{s12}$ is the value in row 1 and column 2 of $C_s$, and $c_{s22}$ is the value in row 2, column 2 of $C_s$.

The joint angle calculation model of joint 2 is $\sin\theta_2 = -a_{s32} \sin\psi - b_{s32} \cos\psi - c_{s32}$, where $\theta_2$ is the joint angle of the joint 2, $a_{s32}$ is the value in row 3 and column 2 of $A_s$, $b_{s32}$ is the value in row 3 and column 2 of $B_s$, and $C_{s32}$ is the value in row 3 value and column 2 of $C_s$.

The joint angle calculation model of joint 3 is $$\tan\theta_3 = \frac{a_{s33}\sin\psi + b_{s33}\cos\psi + c_{s33}}{-a_{s31}\sin\psi - b_{s31}\cos\psi - c_{s31}},$$

where $\theta_3$ is the joint angle of joint 3, $a_{s33}$ is the value in row 3 and column 3 of $A_s$, $a_{s31}$ is the value in row 3 and column 1 of $A_s$, $b_{s33}$ is the value in row 3 and column 3 of $B_s$, $b_{s31}$ is the value in row 3 and column 1 of $B_s$, $c_{s33}$ is the value in row 3 and column 3 of $C_s$, and $c_{s31}$ is the value in row 3 and column 1 of $C_s$, The joint angle calculation model of joint 5 is $$\tan\theta_5 = \frac{a_{w13}\sin\psi + b_{w13}\cos\psi + c_{w13}}{-a_{w23}\sin\psi - b_{w23}\cos\psi - c_{w23}},$$

where $\theta_5$ is the value in the joint angle of joint 5, $a_{w13}$ is the value in row 1 and column 3 of $A_w$, $a_{w23}$ is the value in row 2 and column 3 of $A_w$, $b_{w13}$ is the value in row 1 and column 3 of $B_w$, $b_{w23}$ is the value in row 2 and column 3 in $B_w$, $c_{w13}$ is the value in row 1 and column 3 in $C_w$, $c_{w23}$ is the value in row 2 and column 3 in $C_w$.

The joint angle calculation model of joint 6 is $\sin\theta_6 = a_{w33} \sin\psi + b_{w33} \cos\psi + c_{w33}$, where $\theta_6$ is the joint angle of joint 6, $a_{w33}$ is the value in row 3 and column 3 of $A_w$, $b_{w33}$ is the value in row 3 and column 3 of $B_w$, and $c_{w33}$ is the value in row 3 and column 3 of $C_w$.

The joint angle calculation model of joint 7 is $$\tan\theta_7 = \frac{-a_{w32}\sin\psi - b_{w32}\cos\psi - c_{w32}}{a_{w33}\sin\psi + b_{w31}\cos\psi + c_{w33}},$$

where $\eta_7$ is the joint angle of joint 7, $a_{w32}$ is the value in row 3 and column 2 in $A_w$, $a_{w31}$ is the value in row 3 and column 1 in $A_w$, $b_{w32}$ is the value in row 3 and column 2 of $B_w$, $b_{w31}$ is the value in row 3 and column 1 in $B_w$, $c_{w32}$ is the value in row 3 and column 2 in $C_w$, and $c_{w31}$ is the value in row 3 and column 1 in $C_w$.

The calculation models of the above-mentioned joint angles may be unified to obtain the joint angle calculation model, when the target joint is joint 1, joint 3, joint 5 or joint 7 of the robotic arm, as an equation of $$\tan\theta_i = \frac{a_{ni}\sin\psi + b_{ni}\cos\psi + c_{ni}}{a_{di}\sin\psi + b_{di}\cos\psi + c_{di}};$$

and the joint angle calculation model, when the target joint is the joint 2 or joint 6 of the robotic arm, as an equation of $\sin\theta_j = a_j \sin\psi + b_j \cos\psi + c_j$.

There are two types of calculation models for joint angles, namely tan type and sin type because different methods are used to establish the DH coordinate systems.

Figure 11:
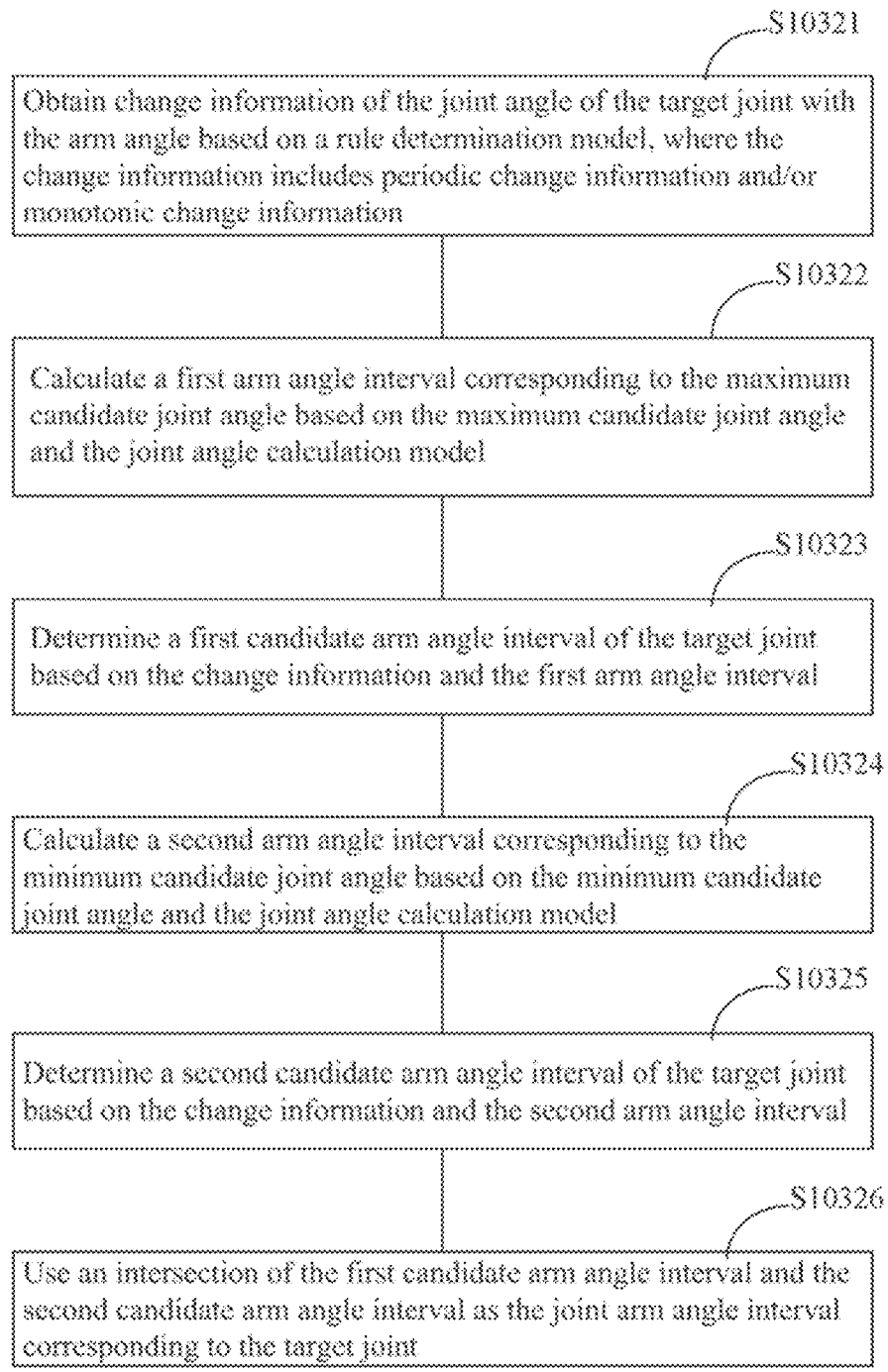
FIG. 11 is a flow chart of a joint arm angle interval solving method according to an embodiment of the present disclosure.

FIG. 11 is a flow chart of a joint arm angle interval solving method according to an embodiment of the present disclosure. As shown in FIG. 11, in this embodiment, when the target joint is joint 1, joint 3, joint 5 or joint 7 of the robotic arm, S1032 may include the following sub-steps.

S10321: obtaining change information of the joint angle of the target joint with the arm angle based on a rule determination model, where the rule determination model is $$F = a_{ti}^2 + b_{ti}^2 - c_{ti}^2,$$

and the change information includes periodic change information and/or monotonic change information.

In this embodiment, as shown in FIG. 4, if $$F = a_{ti}^2 + b_{ti}^2 - c_{ti}^2$$

is larger than zero, the joint angle changes periodically as the arm angle changes. In addition, as shown in part 3 and part 4 of FIG. 4, due to the incompleteness of the inverse tangent function a tan 2, when the joint is limited between $-\pi$ to $+\pi$, as the arm angle changes periodically, a $2\pi$ jittering of the joint angle is generated at the position less than $-\pi$ and larger than $+\pi$, there will be a $2\pi$ jump in the joint angle. As shown FIGS. 5-6, when $$F = a_{ti}^2 + b_{ti}^2 - c_{ti}^2$$

is less than or equal to 0, the joint angle changes monotonically as the arm angle changes. In which, the monotonic change includes monotonic increase and/or monotonic decrease. As shown in FIG. 6, when $$F = a_{ti}^2 + b_{ti}^2 - c_{ti}^2$$

is equal to 0, the joint angle is discontinuous at which the arm angle is 0.

From the forgoing, it determines the change information of the joint angle of the target joint with the arm angle as the periodic change information, in response to $$F = a_{ti}^2 + b_{ti}^2 - c_{ti}^2$$

being larger than 0; and it determines the change information of the joint angle of the target joint with the arm angle as the monotonic change information, in response to $$F = a_{ti}^2 + b_{ti}^2 - c_{ti}^2$$

being less than or equal to 0.

S10322: calculating a first arm angle interval corresponding to the maximum candidate joint angle based on the maximum candidate joint angle and the joint angle calculation model.

In this embodiment, the maximum candidate joint angle may be input into the joint angle calculation model so as to obtain the first arm angle interval corresponding to the maximum candidate joint angle in inverse solving manner.

S10323: determining a first candidate arm angle interval of the target joint based on the change information and the first arm angle interval.

In this embodiment, at joint 1, joint 3, joint 5, or joint 7, because there have different changing patterns of the joint angle with the arm angle, the methods for solving the first candidate arm angle interval are different for different change information. Therefore, the corresponding solving method may be selected, according to the change information corresponding to the target joint, to calculate the first candidate arm angle interval.

S10324: calculating a second arm angle interval corresponding to the minimum candidate joint angle based on the minimum candidate joint angle and the joint angle calculation model.

In this embodiment, the minimum candidate joint angle may be input into the joint angle calculation model, and the second arm angle interval corresponding to the minimum candidate joint angle may be obtained in inverse solving manner.

S10325: determining a second candidate arm angle interval of the target joint based on the change information and the second arm angle interval.

Similarly, the second candidate arm angle interval may be obtained based on the change information of the target joint.

S10326: using an intersection of the first candidate arm angle interval and the second candidate arm angle interval as the joint arm angle interval corresponding to the target joint.

In this embodiment, the joint arm angle interval corresponding to the target joint may be inversely solved by first determining the change information of the joint angle of the target joint with the arm angle, the maximum candidate joint angle, and the minimum candidate joint angle.

As an example, when the joint angle of the target joint changes periodically, it may first determine the size relationship between the maximum candidate joint angle and a preset first maximum reference joint angle of the target joint. If the maximum candidate joint angle is less than or equal to the preset first maximum reference joint angle of the target joint, the first arm angle interval corresponding to the maximum candidate joint angle may be taken as the first candidate arm angle interval.

Figure 12:
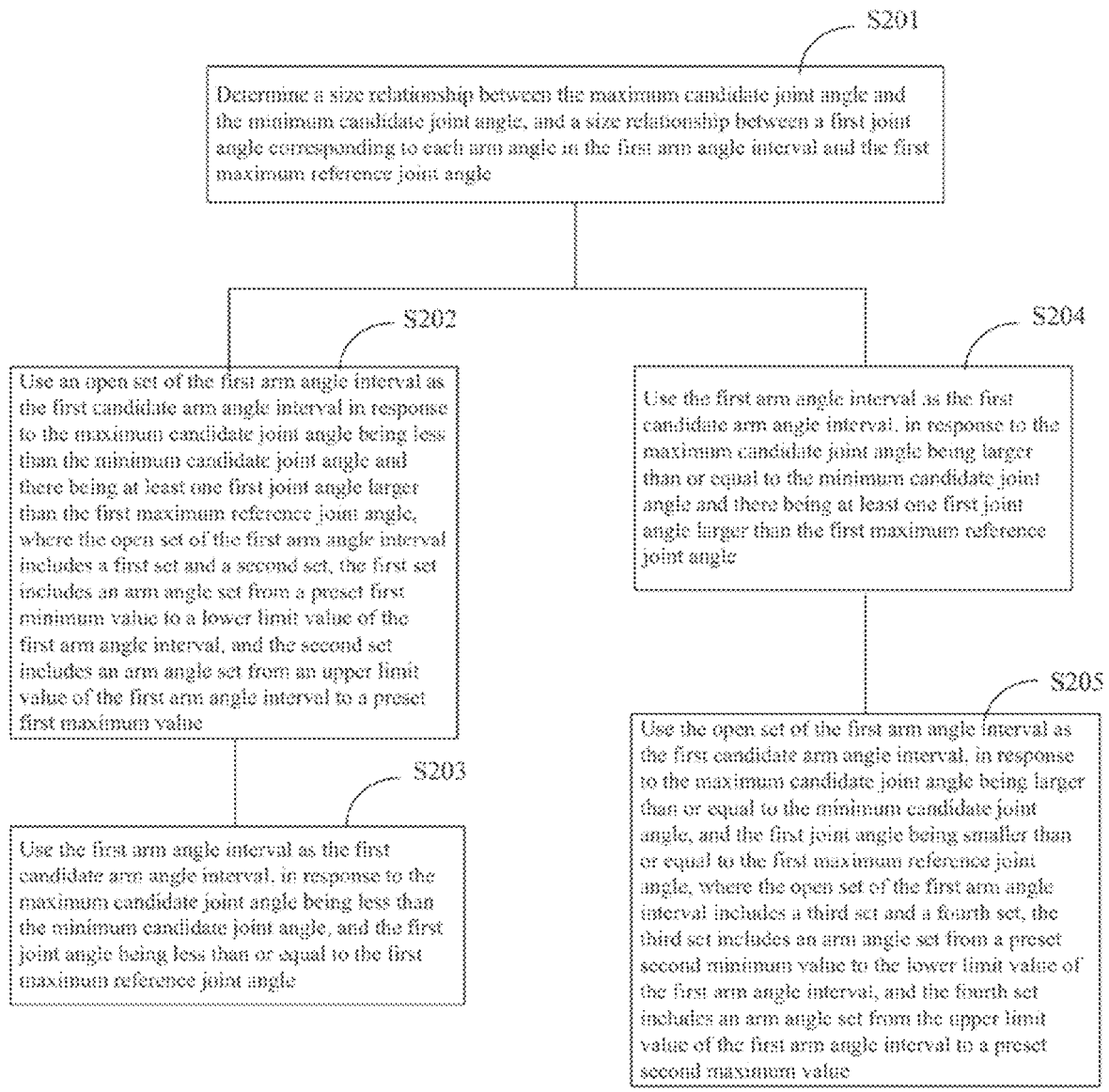
FIG. 12 is a flow chart of a method for solving a first candidate arm angle interval when the joint angle of a target joint changes periodically according to an embodiment of the present disclosure.

FIG. 12 is a flow chart of a method for solving a first candidate arm angle interval when the joint angle of a target joint changes periodically according to an embodiment of the present disclosure. As shown in FIG. 12, as an example, when the joint angle of the target joint changes periodically and the maximum candidate joint angle is larger than a preset first maximum reference joint angle of the target joint, step S10323 may include the following sub-steps.

S201: determining a size relationship between the maximum candidate joint angle and the minimum candidate joint angle, and a size relationship between a first joint angle corresponding to each arm angle in the first arm angle interval and the first maximum reference joint angle.

In this embodiment, if the maximum candidate joint angle is smaller than the minimum candidate joint angle, it means that the joint angle jitters in the $2\pi$ interval; otherwise, there is no jitter in the $2\pi$ interval.

In this embodiment, the first maximum reference joint angle may be set according to actual needs, and each target joint corresponds to one maximum reference joint angle.

As an example, the motion range corresponding to each joint in the robotic arm may set in advance. As shown in Table 1 below, the first maximum reference joint angle corresponding to each target joint may be determined according to Table 1.

TABLE 1

| Preset motion range corresponding to each joint of the robotic arm | | | | | | | |
|---|---|---|---|---|---|---|---|
| Joint | 1 | 2 | 3 | 4 | 5 | 6 | 7 |
| Angle/Radian | −1.727-3.14 | −1.57-0 | −2.6-2.6 | −2.3-0.2 | −2.3-2.3 | −0.85-0.8 | −1.3-1.3 |

S202: using an open set of the first arm angle interval as the first candidate arm angle interval in response to the maximum candidate joint angle being less than the minimum candidate joint angle and there being at least one first joint angle larger than the first maximum reference joint angle, where the open set of the first arm angle interval includes a first set and a second set, the first set includes an arm angle set from a preset first minimum value to a lower limit value of the first arm angle interval, and the second set includes an arm angle set from an upper limit value of the first arm angle interval to a preset first maximum value.

In this embodiment, the preset first minimum value may be set according to actual needs, and the preset first maximum value may also be set according to actual needs.

As an example, if the first arm angle interval is (1, 2), the first minimum preset value is $-\pi$, and the first maximum preset value is $\pi$, then the open set of the first arm angle interval will be $(-\infty, 1] \cup [2, +\infty)$.

S203: using the first arm angle interval as the first candidate arm angle interval, in response to the maximum candidate joint angle being less than the minimum candidate joint angle, and the first joint angle being less than or equal to the first maximum reference joint angle.

In this embodiment, when the maximum candidate joint angle is smaller than the minimum candidate joint angle, and the first joint angle is smaller than or equal to the first maximum reference joint angle, then the closed set of the first arm angle interval may be taken as the first candidate arm angle interval. The closed set of the first arm angle interval is just the first arm angle interval.

S204: using the first arm angle interval as the first candidate arm angle interval, in response to the maximum candidate joint angle being larger than or equal to the minimum candidate joint angle and there being at least one first joint angle larger than the first maximum reference joint angle.

S205: using the open set of the first arm angle interval as the first candidate arm angle interval, in response to the maximum candidate joint angle being larger than or equal to the minimum candidate joint angle, and the first joint angle being smaller than or equal to the first maximum reference joint angle, where the open set of the first arm angle interval includes a third set and a fourth set, the third set includes an arm angle set from a preset second minimum value to the lower limit value of the first arm angle interval, and the fourth set includes an arm angle set from the upper limit value of the first arm angle interval to a preset second maximum value.

In this embodiment, S205 is similar to step S202 and reference may be made to step S202, which will not be described herein.

Figure 13:
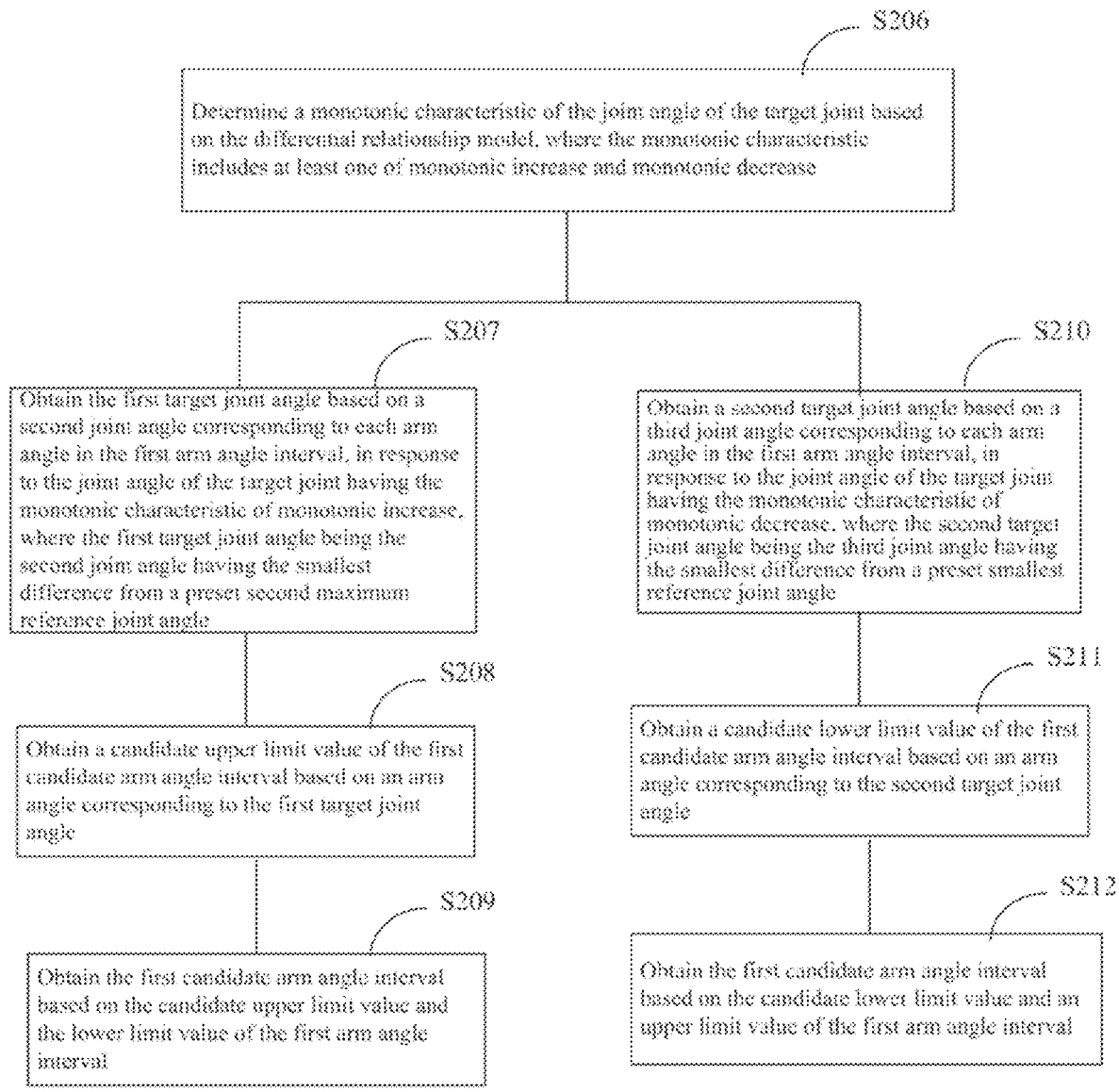
FIG. 13 is a flow chart of a method for solving the first candidate arm angle interval when the joint angle of the target joint changes monotonically according to an embodiment of the present disclosure.

FIG. 13 is a flow chart of a method for solving the first candidate arm angle interval when the joint angle of the target joint changes monotonically according to an embodiment of the present disclosure. As shown in FIG. 13, when the joint angle of the target joint changes monotonically, step S10323 may include the following sub-steps.

S206: determining a monotonic characteristic of the joint angle of the target joint based on the differential relationship model, where the monotonic characteristic includes at least one of monotonic increase and monotonic decrease.

In this embodiment, the monotonic characteristics may be obtained according to $a_{ti}$, $b_{ti}$, and $c_{ti}$ in the differential relationship model, and the value of the differential relationship model may be obtained by inputting any $\psi$ into the differential relationship model. If the value is positive, it will monotonically increase; otherwise, it will monotonically decrease.

S207: obtaining the first target joint angle based on a second joint angle corresponding to each arm angle in the first arm angle interval, in response to the joint angle of the target joint having the monotonic characteristic of monotonic increase, where the first target joint angle being the second joint angle having the smallest difference from a preset second maximum reference joint angle.

In this embodiment, the difference between the second joint angle and the second maximum reference joint angle may be calculated, and the second joint angle corresponding to the smallest difference may be s taken as the first target joint angle. That is, the joint angle in joint 2 that is closest to the second maximum reference joint angle may be taken as the first target joint angle.

As an example, if the second joint angle is 2-3 and the second maximum reference joint angle is 3.14, then 3 is used as the first target joint angle.

S208: obtaining a candidate upper limit value of the first candidate arm angle interval based on an arm angle corresponding to the first target joint angle.

S209: obtaining the first candidate arm angle interval based on the candidate upper limit value and the lower limit value of the first arm angle interval.

S210: obtaining a second target joint angle based on a third joint angle corresponding to each arm angle in the first arm angle interval, in response to the joint angle of the target joint having the monotonic characteristic of monotonic decrease, where the second target joint angle being the third joint angle having the smallest difference from a preset smallest reference joint angle.

In this embodiment, step S210 is similar to step S207. Please refer to step S207, which will not be described herein.

S211: obtaining a candidate lower limit value of the first candidate arm angle interval based on an arm angle corresponding to the second target joint angle.

S212: obtaining the first candidate arm angle interval based on the candidate lower limit value and an upper limit value of the first arm angle interval.

In one embodiment, after step S10323, step S1032 may further include the following sub-steps.

S301: determining whether arm angles in the first candidate arm angle interval meet a preset requirement, where the arm angle that meets the preset requirement includes the arm angle within a first position limited interval when the joint angle of the target joint changes periodically, and the arm angle within a second position limited interval when the joint angle of the target joint changes monotonically.

In this embodiment, a limit interval may be set in advance. The limit interval may be set according to actual needs, which includes arm angles that the robotic arm cannot reach.

The first limiting interval and the second limiting interval may be the same; or otherwise, be different.

The first limiting interval may include a continuous interval, and may also include various arm angles. For example, the first limiting interval may be $-2.7$-$2.7$.

The second limit interval may include a continuous interval, and may also include various arm angles, and may further include a neighborhood of arm angles. For example, the second limit interval may include 0, $-\pi$, $+\pi$, a neighborhood of 0, and a neighborhood of $-\pi$. In this embodiment, the size of the neighborhood of the arm angle may be set according to actual needs.

S302: obtaining the first candidate arm angle interval after removing the arm angle that meets the preset requirement by removing the arm angle that meet the preset requirement in the first candidate arm angle interval, in response to there being the arm angle that meets the preset requirement in the first candidate arm angle interval.

In this embodiment, when the joint angle of the target joint changes periodically, the intersection of the first candidate arm angle interval and the first limit interval may be calculated, where the intersection of the first candidate arm angle interval and the first limit interval are the arm angles exceed an upper limit. The intersection of the first candidate arm angle interval and the first limit interval in the first candidate arm angle interval may be removed to obtain the first candidate arm angle interval after removing the arm angles that meet the preset requirement.

As an example, when the joint angle of the target joint changes periodically and the minimum candidate joint angle is smaller than the preset first minimum reference joint angle of the target joint, step S10325 may be implemented with reference to step S10323. Specifically, refer to steps S201-S205, which will not be described herein.

As an example, when the joint angle of the target joint changes monotonically, step S10325 may be implemented with reference to step S10323. Specifically, refer to steps S206-S212, which will not be described herein.

As an example, after step S10325, step S1032 may further include:
obtaining the second candidate arm angle interval after removing the arm angles meeting the requirement by removing the arm angles meeting the requirement in the second candidate arm angle interval. Specifically, reference may be made to step S301-S302.

As an example, as shown in FIG. 7, in the diagram of the change of the relationship between the arm angle and the joint angle when the target joint is joint 2 or joint 6 of the robotic arm, the change of the joint angle with that of the arm angle is continuous. Therefore, when the target joint is joint 2 or joint 6 of the robotic arm, the implementation of step S302 may refer to the method of calculating the joint arm angle interval of the target joint when the joint angle of the target joint changes periodically, which will not be described herein.

As an example, after step S104, the above-mentioned method may further include:
selecting an applied arm angle of the robotic arm based on the target arm angle interval; and
obtaining an applied joint angle of the target joint of the robotic arm based on the applied arm angle and the joint angle calculation model.

In this embodiment, after calculating the target arm angle interval of the robotic arm, the appropriate applied arm angle may be selected according to actual needs. The applied joint angle of each target joint may be obtained by inputting the applied arm angle into the joint angle calculation model corresponding to each target joint.

After obtaining the applied joint angles of each target joint, control instructions may be generated based on each applied joint angle, where the control instructions are used to control the robotic arm to move.

After the robotic arm moves according to the control instructions, the actual pose of the end of the robotic arm may be obtained. The obtained actual pose of the end of the robotic arm may be compared with a preset reference pose so as to determine whether the inverse solving method for the arm angle interval of the robotic arm meets the requirement. If the difference between the actual pose and the preset reference posture is within a preset range, the inverse solving method for the arm angle interval of the robotic arm may be determined as meeting the requirement; otherwise, it may be determined as not meeting the requirement.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 14:
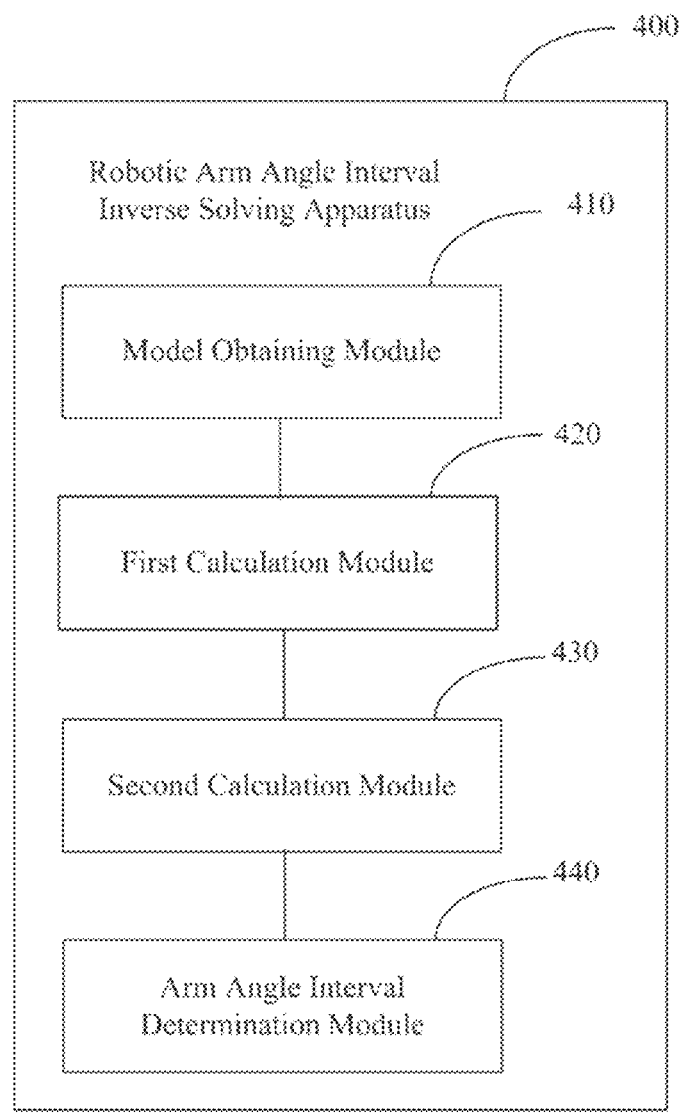
FIG. 14 is a schematic block diagram of the structure of a robotic arm angle interval inverse solving apparatus according to an embodiment of the present disclosure.

FIG. 14 is a schematic block diagram of the structure of a robotic arm angle interval inverse solving apparatus according to an embodiment of the present disclosure. An inverse solving apparatus for the arm angle interval of the above-mentioned robotic arm that corresponds to the above-mentioned robotic arm angle interval inverse solving method is provided. For convenience of explanation, only parts relevant to this embodiment are shown.

As shown in FIG. 14, the apparatus 400 may include a model obtaining module 410, a first calculation module 420, a second calculation module 430, and an arm angle interval determination module 440. In which, the model obtaining module 410 is configured to obtain a joint angle calculation model and a differential relationship model of a target joint of the robotic arm, where the target joint is any joint of the robotic arm except the elbow joint; the joint angle calculation model represents a first relationship between a joint angle and arm angle of the target joint, the differential relationship model represents a second relationship between the joint angle and the arm angle of the target joint; and the arm angle of the target joint is an included angle between a plane formed by each joint of the robotic arm and a reference plane;

the first calculation module 420 is configured to obtain extreme arm angles corresponding to a joint angle of the differential relationship model at extreme values based on the differential relationship model, where the extreme arm angles include an arm angle corresponding to the joint angle of the differential relationship model at a maximum value and an arm angle corresponding to the joint angle of the differential relationship model at a minimum value;

the second calculation module 430 is configured to obtain a joint arm angle interval corresponding to the target joint based on the extreme arm angle and the joint angle calculation model; and the arm angle interval determination module 440 is configured to obtain a target arm angle interval corresponding to the robotic arm based on the joint arm angle interval corresponding to the target joint of the robotic arm.

In one embodiment, when the target joint is joint 1, joint 3, joint 5, or joint 7 of the robotic arm, the joint angle calculation model is as an equation of:

$$\tan \theta_i = \frac{a_{ni}\sin \psi + b_{ni}\cos \psi + c_{ni}}{a_{di}\sin \psi + b_{di}\cos \psi + c_{di}};$$

where, $\theta_i$ is the joint angle of the i-th joint, i is one of 1, 3, 5 and 7, $a_{ni}$, $b_{ni}$, $c_{ni}$, $a_{di}$, $b_{di}$ and $c_{di}$ are coefficients in the joint angle calculation model that corresponds to the i-th joint, and $\psi$ is the arm angle; and when the target joint is joint 2 or joint 6 of the robotic arm, the joint angle calculation model is as an equation of:

$$\sin \theta_j = a_j \sin \psi + b_j \cos \psi + c_j.$$

where $\theta_j$ is the joint angle of the j-th joint, j is one of 2 and 6, $a_j$, $b_j$, and $c_j$ are coefficients in the joint angle calculation model that correspond to the j-th joint, and $\psi$ is the arm angle.

In one embodiment, when the target joint is joint 1, joint 3, joint 5, or joint 7 of the robotic arm, the differential relationship model is as an equation of:

$$f_i(\psi) = \frac{d\theta_i}{d\psi} = \frac{a_{ti}\sin\psi + b_{ti}\cos\psi + c_{ti}}{f_{ni}^2(\psi) + f_{di}^2(\psi)};$$

where, $\theta_i$ is the joint angle of the i-th joint, i is one of 1, 3, 5 and 7, $a_{ti}$, $b_{ti}$ and $c_{ti}$ are coefficients in the differential relationship model that correspond to the i-th joint, and $\psi$ is the arm angle, $a_{ti}=b_{di}\times c_{ni}-b_{ni}\times c_{di}$, $b_{ti}=a_{ni}\times c_{di}-a_{di}\times c_{ni}$, $c_{ti}=a_{ni}\times b_{di}-a_{di}\times b_{ni}$, $f_{ni}(\psi)=a_{ni}\sin\psi+b_{ni}\cos\psi+c_{ni}$, $f_{di}(\psi)=a_{di}\sin\psi+b_{di}\cos\psi+c_{di}$; and when the target joint is joint 2 or joint 6 of the robotic arm, the differential relationship model is as an equation of:

$$f_j(\psi) = \frac{d\theta_j}{d\psi} = \frac{1}{\cos\theta_j}(a_j\cos\psi - b_j\sin\psi);$$

where $\theta_j$ is the joint angle of the j-th joint, j is one of 2 and 6, $a_j$, $b_j$, and $c_j$ are coefficients in the joint angle calculation model that correspond to the j-th joint, and $\psi$ is the arm angle.

In one embodiment, the second calculation module 430 may include:
a candidate joint angle calculation unit configured to obtain a candidate joint angle of the target joint based on the extreme arm angle and the joint angle calculation model, where the candidate joint angle includes a maximum candidate joint angle and a minimum candidate joint angle; and
a joint arm angle interval determining unit configured to obtain a joint arm angle interval corresponding to the target joint based on the candidate joint angle and the joint angle calculation model.

In one embodiment, when the target joint is joint 1, joint 3, joint 5, or joint 7 of the robotic arm, the joint arm angle interval determining unit may be configured to:
obtain change information of the joint angle of the target joint with the arm angle based on a rule determination model, where the rule determination model is $$F = a_{ti}^2 + b_{ti}^2 - c_{ti}^2,$$

and the change information includes at least one of periodic change information and monotonic change information;
calculate a first arm angle interval corresponding to the maximum candidate joint angle based on the maximum candidate joint angle and the joint angle calculation model;
determine a first candidate arm angle interval of the target joint based on the change information and the first arm angle interval;
calculate a second arm angle interval corresponding to the minimum candidate joint angle based on the minimum candidate joint angle and the joint angle calculation model;
determine a second candidate arm angle interval of the target joint based on the change information and the second arm angle interval; and
use an intersection of the first candidate arm angle interval and the second candidate arm angle interval as the joint arm angle interval corresponding to the target joint.

In one embodiment, the joint arm angle interval determining unit may be configured to:
determine the change information of the joint angle of the target joint with the arm angle as the periodic change information, in response to $$F = a_{ti}^2 + b_{ti}^2 - c_{ti}^2$$

being larger than 0; and
determine the change information of the joint angle of the target joint with the arm angle as the monotonic change information, in response to $$F = a_{ti}^2 + b_{ti}^2 - c_{ti}^2$$

being less than or equal to 0.

In one embodiment, when the joint angle of the target joint changes periodically and the maximum candidate joint angle is larger than a preset first maximum reference joint angle of the target joint, the joint arm angle interval determining unit may be configured to:
determine a size relationship between the maximum candidate joint angle and the minimum candidate joint angle, and a size relationship between a first joint angle corresponding to each arm angle in the first arm angle interval and the first maximum reference joint angle;
take an open set of the first arm angle interval as the first candidate arm angle interval in response to the maximum candidate joint angle being less than the minimum candidate joint angle and there being at least one first joint angle larger than the first maximum reference joint angle, where the open set of the first arm angle interval includes a first set and a second set, the first set includes an arm angle set from a preset first minimum value to a lower limit value of the first arm angle interval, and the second set includes an arm angle set from an upper limit value of the first arm angle interval to a preset first maximum value;
take the first arm angle interval as the first candidate arm angle interval, in response to the maximum candidate joint angle being less than the minimum candidate joint angle, and the first joint angle being less than or equal to the first maximum reference joint angle;
take the first arm angle interval as the first candidate arm angle interval, in response to the maximum candidate joint angle being larger than or equal to the minimum candidate joint angle and there being at least one first joint angle larger than the first maximum reference joint angle; and
take the open set of the first arm angle interval as the first candidate arm angle interval, in response to the maximum candidate joint angle being larger than or equal to the minimum candidate joint angle, and the first joint angle being smaller than or equal to the first maximum reference joint angle, where the open set of the first arm angle interval includes a third set and a fourth set, the third set includes an arm angle set from a preset second minimum value to the lower limit value of the first arm angle interval, and the fourth set includes an arm angle set from the upper limit value of the first arm angle interval to a preset second maximum value.

In one embodiment, when the joint angle of the target joint changes monotonically, the joint arm angle interval determining unit may be configured to:

determine a monotonic characteristic of the joint angle of the target joint based on the differential relationship model, where the monotonic characteristic includes at least one of monotonic increase and monotonic decrease;

obtain the first target joint angle based on a second joint angle corresponding to each arm angle in the first arm angle interval, in response to the joint angle of the target joint having the monotonic characteristic of monotonic increase, where the first target joint angle being the second joint angle having the smallest difference from a preset second maximum reference joint angle;

obtain a candidate upper limit value of the first candidate arm angle interval based on an arm angle corresponding to the first target joint angle;

obtain the first candidate arm angle interval based on the candidate upper limit value and the lower limit value of the first arm angle interval;

obtain a second target joint angle based on a third joint angle corresponding to each arm angle in the first arm angle interval, in response to the joint angle of the target joint having the monotonic characteristic of monotonic decrease, where the second target joint angle being the third joint angle having the smallest difference from a preset smallest reference joint angle;

obtain a candidate lower limit value of the first candidate arm angle interval based on an arm angle corresponding to the second target joint angle; and obtain the first candidate arm angle interval based on the candidate lower limit value and an upper limit value of the first arm angle interval.

In one embodiment, the joint arm angle interval determining unit may be configured to:

determine whether arm angles in the first candidate arm angle interval meet a preset requirement, where the arm angle that meets the preset requirement includes the arm angle within a first position limited interval when the joint angle of the target joint changes periodically, and the arm angle within a second position limited interval when the joint angle of the target joint changes monotonically; and obtain the first candidate arm angle interval after removing the arm angle that meets the preset requirement by removing the arm angle that meet the preset requirement in the first candidate arm angle interval, in response to there being the arm angle that meets the preset requirement in the first candidate arm angle interval;

the using the intersection of the first candidate arm angle interval and the second candidate arm angle interval as the joint arm angle interval corresponding to the target joint may include:

take the intersection of the first candidate arm angle interval after removing the arm angle that meets the preset requirement and the second candidate arm angle interval as the joint arm angle interval corresponding to the target joint.

In one embodiment, the arm angle interval determination module 440 may be configured to:

take the intersection of the joint arm angle intervals corresponding to the target joints of the robotic arm as the target arm angle interval corresponding to the robotic arm.

It should be noted that, the information exchange, execution process and other contents between the above-mentioned device/units are based on the same concept as the method embodiments of the present disclosure. For the specific functions and technical effects, please refer to the method embodiments, which will not be repeated herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 15:
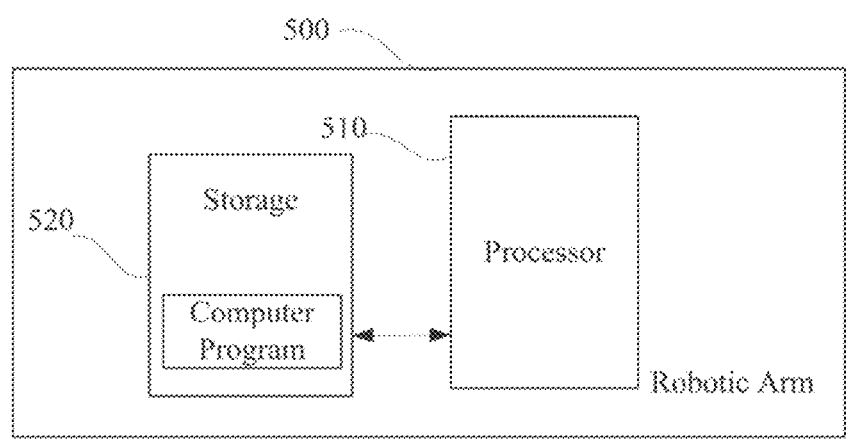
FIG. 15 is a schematic block diagram of the structure of a robotic arm according to an embodiment of the present disclosure.

FIG. 15 is a schematic block diagram of the structure of a robotic arm according to an embodiment of the present disclosure. As shown in FIG. 15, in this embodiment, a robotic arm 500 includes at least a processor 510, a storage 520, and a computer program stored in the storage 520 and executable on the processor 510. When executing (instructions in) the computer program, the processor 510 implements the steps in the above-mentioned embodiments of the method, for example, steps S101-S104 shown in the embodiment of FIG. 2. Alternatively, when the processor 510 executes the (instructions in) computer program, the functions of each module/unit in the above-mentioned device embodiments, for example, the functions of the modules 410-440 shown in FIG. 14 are implemented.

Exemplarily, the computer program may be divided into one or more modules/units, and the one or more modules/units are stored in the storage 520 and executed by the processor 510 to realize the present disclosure. The one or more modules/units may be a series of computer program instruction sections capable of performing a specific function, and the instruction sections are for describing the execution process of the computer program in the terminal device 500.

It can be understood by those skilled in the art that FIG. 14 is merely an example of the terminal device 500 and does not constitute a limitation on the terminal device 500, and may include more or fewer components than those shown in the figure, or a combination of some components or different components such as an input/output device, a network access device, a bus, and the like.

The processor 510 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 520 may be an internal storage unit of the terminal device 500, and may also be an external storage device of the terminal device 500, for example, a plug-in hard disk, a smart media card (SMC), a secure digital (SD) card, flash card, and the like. The storage 520 is configured to store the computer program and other programs and data required by the terminal device 500. The storage 520 may also be used to temporarily store data that has been or will be output.

The above-mentioned bus may be an industry standard architecture (ISA) bus, a peripheral component interconnect (PCI) bus, an extended industry standard architecture (EISA) bus, or the like. The bus may be divided into address bus, data bus, control buss, and the like. For ease of expression, the bus in the drawings of the present disclosure is not limited to only one bus or one type of bus.

The inverse solving method for the arm angle interval of the robotic arm provided by the embodiments of the present disclosure may be applied to terminal devices such as computers, tablets, laptops, netbooks, personal digital assistants (PDAs), and the like. There are no restrictions on the specific type of terminal device.

In the present disclosure, a computer-readable storage medium is also provided. The computer-readable storage medium stores computer program(s). When the computer program(s) are executed by a processor, the inverse solving method for the arm angle interval of the robotic arm in forgoing embodiments can be implemented.

In the present disclosure, a computer program product is also provided. When the computer program product is executed on a mobile terminal, the mobile terminal can implement the steps in the inverse solving method for the arm angle interval of the robotic arm in forgoing embodiments.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented inverse solving method for an arm angle interval of a seven-degree-of-freedom robotic arm having an elbow joint with offset, comprising:
   obtaining a joint angle calculation model and a differential relationship model of a target joint of the robotic arm, wherein the target joint is any joint of the robotic arm except the elbow joint; the joint angle calculation model represents a first relationship between a joint angle and arm angle of the target joint, the differential relationship model represents a second relationship between the joint angle and the arm angle of the target joint; and the arm angle of the target joint is an included angle between a plane formed by each joint of the robotic arm and a reference plane;
   obtaining extreme arm angles corresponding to a joint angle of the differential relationship model at extreme values based on the differential relationship model, wherein the extreme arm angles include an arm angle corresponding to the joint angle of the differential relationship model at a maximum value and an arm angle corresponding to the joint angle of the differential relationship model at a minimum value;
   obtaining a joint arm angle interval corresponding to the target joint based on the extreme arm angle and the joint angle calculation model; and
   obtaining a target arm angle interval for controlling the robotic arm to move based on the joint arm angle interval corresponding to the target joint of the robotic arm;
   wherein obtaining the joint arm angle interval corresponding to the target joint based on the extreme arm angle and the joint angle calculation model comprises:
      obtaining a candidate joint angle of the target joint based on the extreme arm angle and the joint angle calculation model, wherein the candidate joint angle includes a maximum candidate joint angle and a minimum candidate joint angle; and
      obtaining a joint arm angle interval corresponding to the target joint based on the candidate joint angle and the joint angle calculation model; and
   wherein when the target joint is the first joint, the third joint, the fifth joint, or the seventh joint of the robotic arm, obtaining the joint arm angle interval corresponding to the target joint based on the candidate joint angle and the joint angle calculation model comprises:
      obtaining change information of the joint angle of the target joint with the arm angle based on a rule determination model, wherein the rule determination model is $$F = a_{ti}^2 + b_{ti}^2 - c_{ti}^2,$$

and the change information includes at least one of periodic change information and monotonic change information;
   calculating a first arm angle interval corresponding to the maximum candidate joint angle based on the maximum candidate joint angle and the joint angle calculation model;
   determining a first candidate arm angle interval of the target joint based on the change information and the first arm angle interval;
   calculating a second arm angle interval corresponding to the minimum candidate joint angle based on the minimum candidate joint angle and the joint angle calculation model;
   determining a second candidate arm angle interval of the target joint based on the change information and the second arm angle interval; and
   using an intersection of the first candidate arm angle interval and the second candidate arm angle interval as the joint arm angle interval corresponding to the target joint.

2. The method of claim 1, wherein when the target joint is the first joint, the third joint, the fifth joint, or the seventh joint of the robotic arm, the joint angle calculation model is as an equation of:

$$\tan\theta_i = \frac{a_{ni}\sin\psi + b_{ni}\cos\psi + c_{ni}}{a_{di}\sin\psi + b_{di}\cos\psi + c_{di}};$$

where, is the joint angle of the i-th joint, i is one of 1, 3, 5 and 7, $a_{ni}$, $b_{ni}$, $c_{ni}$, $a_{di}$, $b_{di}$ and $c_{di}$ are coefficients in the joint angle calculation model that corresponds to the i-th joint, and $\psi$ is the arm angle; and when the target joint is the second joint or the sixth joint of the robotic arm, the joint angle calculation model is as an equation of:

$$\sin \theta_j = a_j \sin \psi + b_j \cos \psi + c_j;$$

where $\theta_j$ is the joint angle of the j-th joint, j is one of 2 and 6, $a_j$, $b_j$ and $c_j$ are coefficients in the joint angle calculation model that correspond to the j-th joint, and $\psi$ is the arm angle.

3. The method of claim 2, wherein when the target joint is the first joint, the third joint, the fifth joint, or the seventh joint of the robotic arm, the differential relationship model is as an equation of:

$$f_i(\psi) = \frac{d\theta_i}{d\psi} = \frac{a_{ti}\sin\psi + b_{ti}\cos\psi + c_{ti}}{f_{ni}^2(\psi) + f_{di}^2(\psi)};$$

where, $\theta_i$ is the joint angle of the i-th joint, i is one of 1, 3, 5 and 7, $a_{ti}$, $b_{ti}$ and $c_{ti}$ are coefficients in the differential relationship model that correspond to the i-th joint, and $\psi$ is the arm angle, $a_{ti}=b_{di}\times c_{ni}-b_{ni}\times c_{di}$, $b_{ti}=a_{ni}\times c_{di}-a_{di}\times c_{ni}$, $c_{ti}=a_{ni}\times b_{di}-a_{di}\times b_{ni}$, $f_{ni}(\psi)=a_{ni}\sin\psi+b_{ni}\cos\psi+c_{ni}$, $f_{di}(\psi)=a_{di}\sin\psi+b_{di}\cos\psi+c_{di}$; and when the target joint is the second joint or the sixth joint of the robotic arm, the differential relationship model is as an equation of:

$$f_j(\psi) = \frac{d\theta_j}{d\psi} = \frac{1}{\cos\theta_j}(a_j\cos\psi - b_j\sin\psi);$$

where $\theta_j$ is the joint angle of the j-th joint, j is one of 2 and 6, $a_j$, $b_j$ and $c_j$ are coefficients in the joint angle calculation model that correspond to the j-th joint, and $\psi$ is the arm angle.

4. The method of claim 1, wherein obtaining the change information of the joint angle of the target joint with the arm angle based on the rule determination model comprises:
determining the change information of the joint angle of the target joint with the arm angle as the periodic change information, in response to $$F = a_{ti}^2 + b_{ti}^2 - c_{ti}^2$$

being larger than 0; and
determining the change information of the joint angle of the target joint with the arm angle as the monotonic change information, in response to $$F = a_{ti}^2 + b_{ti}^2 - c_{ti}^2$$

being less than or equal to 0.

5. The method of claim 1, wherein when the joint angle of the target joint changes periodically and the maximum candidate joint angle is larger than a preset first maximum reference joint angle of the target joint, determining the first candidate arm angle interval of the target joint based on the change information and the first arm angle interval comprises:
determining a size relationship between the maximum candidate joint angle and the minimum candidate joint angle, and a size relationship between a first joint angle corresponding to each arm angle in the first arm angle interval and the first maximum reference joint angle;
using an open set of the first arm angle interval as the first candidate arm angle interval in response to the maximum candidate joint angle being less than the minimum candidate joint angle and there being at least one first joint angle larger than the first maximum reference joint angle, wherein the open set of the first arm angle interval includes a first set and a second set, the first set includes an arm angle set from a preset first minimum value to a lower limit value of the first arm angle interval, and the second set includes an arm angle set from an upper limit value of the first arm angle interval to a preset first maximum value;
using the first arm angle interval as the first candidate arm angle interval, in response to the maximum candidate joint angle being less than the minimum candidate joint angle, and the first joint angle being less than or equal to the first maximum reference joint angle;
using the first arm angle interval as the first candidate arm angle interval, in response to the maximum candidate joint angle being larger than or equal to the minimum candidate joint angle and there being at least one first joint angle larger than the first maximum reference joint angle; and
using the open set of the first arm angle interval as the first candidate arm angle interval, in response to the maximum candidate joint angle being larger than or equal to the minimum candidate joint angle, and the first joint angle being smaller than or equal to the first maximum reference joint angle, wherein the open set of the first arm angle interval includes a third set and a fourth set, the third set includes an arm angle set from a preset second minimum value to the lower limit value of the first arm angle interval, and the fourth set includes an arm angle set from the upper limit value of the first arm angle interval to a preset second maximum value.

6. The method of claim 1, wherein when the joint angle of the target joint changes monotonically, determining the first candidate arm angle interval of the target joint based on the change information and the first arm angle interval comprises:
determining a monotonic characteristic of the joint angle of the target joint based on the differential relationship model, wherein the monotonic characteristic includes at least one of monotonic increase and monotonic decrease;
obtaining the first target joint angle based on a second joint angle corresponding to each arm angle in the first arm angle interval, in response to the joint angle of the target joint having the monotonic characteristic of monotonic increase, wherein the first target joint angle being the second joint angle having the smallest difference from a preset second maximum reference joint angle;
obtaining a candidate upper limit value of the first candidate arm angle interval based on an arm angle corresponding to the first target joint angle;
obtaining the first candidate arm angle interval based on the candidate upper limit value and the lower limit value of the first arm angle interval;

obtaining a second target joint angle based on a third joint angle corresponding to each arm angle in the first arm angle interval, in response to the joint angle of the target joint having the monotonic characteristic of monotonic decrease, wherein the second target joint angle being the third joint angle having the smallest difference from a preset smallest reference joint angle;

obtaining a candidate lower limit value of the first candidate arm angle interval based on an arm angle corresponding to the second target joint angle; and obtaining the first candidate arm angle interval based on the candidate lower limit value and an upper limit value of the first arm angle interval.

7. The method of claim 1, wherein after determining the first candidate arm angle interval of the target joint based on the change information and the first arm angle interval, the method further comprises:

determining whether arm angles in the first candidate arm angle interval meet a preset requirement, wherein the arm angle that meets the preset requirement includes the arm angle within a first position limited interval when the joint angle of the target joint changes periodically, and the arm angle within a second position limited interval when the joint angle of the target joint changes monotonically; and obtaining the first candidate arm angle interval after removing the arm angle that meets the preset requirement by removing the arm angle that meet the preset requirement in the first candidate arm angle interval, in response to there being the arm angle that meets the preset requirement in the first candidate arm angle interval;

wherein using the intersection of the first candidate arm angle interval and the second candidate arm angle interval as the joint arm angle interval corresponding to the target joint comprises:

taking the intersection of the first candidate arm angle interval after removing the arm angle that meets the preset requirement and the second candidate arm angle interval as the joint arm angle interval corresponding to the target joint.

8. The method of claim 1, wherein obtaining the target arm angle interval corresponding to the robotic arm based on the joint arm angle interval corresponding to the target joint of the robotic arm comprises:

taking the intersection of the joint arm angle intervals corresponding to the target joints of the robotic arm as the target arm angle interval corresponding to the robotic arm.

9. A robotic arm with seven-degree-of-freedom, comprising:

an elbow joint with offset;
a processor;
a memory coupled to the processor; and
one or more computer programs stored in the memory and executable on the processor;
wherein, the one or more computer programs comprise:
instructions for obtaining a joint angle calculation model and a differential relationship model of a target joint of the robotic arm, wherein the target joint is any joint of the robotic arm except the elbow joint; the joint angle calculation model represents a first relationship between a joint angle and arm angle of the target joint, the differential relationship model represents a second relationship between the joint angle and the arm angle of the target joint; and the arm angle of the target joint is an included angle between a plane formed by each joint of the robotic arm and a reference plane;

instructions for obtaining extreme arm angles corresponding to a joint angle of the differential relationship model at extreme values based on the differential relationship model, wherein the extreme arm angles include an arm angle corresponding to the joint angle of the differential relationship model at a maximum value and an arm angle corresponding to the joint angle of the differential relationship model at a minimum value;

instructions for obtaining a joint arm angle interval corresponding to the target joint based on the extreme arm angle and the joint angle calculation model; and instructions for obtaining a target arm angle interval for controlling the robotic arm to move based on the joint arm angle interval corresponding to the target joint of the robotic arm;

wherein the instructions for obtaining the joint arm angle interval corresponding to the target joint based on the extreme arm angle and the joint angle calculation model comprise:

instructions for obtaining a candidate joint angle of the target joint based on the extreme arm angle and the joint angle calculation model, wherein the candidate joint angle includes a maximum candidate joint angle and a minimum candidate joint angle; and instructions for obtaining a joint arm angle interval corresponding to the target joint based on the candidate joint angle and the joint angle calculation model; and wherein when the target joint is the first joint, the third joint, the fifth joint, or the seventh joint of the robotic arm, the instructions for obtaining the joint arm angle interval corresponding to the target joint based on the candidate joint angle and the joint angle calculation model comprise:

instructions for obtaining change information of the joint angle of the target joint with the arm angle based on a rule determination model, wherein the rule determination model is $$F = a_n^2 + b_n^2 - c_n^2,$$

and the change information includes at least one of periodic change information and monotonic change information;

instructions for calculating a first arm angle interval corresponding to the maximum candidate joint angle based on the maximum candidate joint angle and the joint angle calculation model;

instructions for determining a first candidate arm angle interval of the target joint based on the change information and the first arm angle interval;

instructions for calculating a second arm angle interval corresponding to the minimum candidate joint angle based on the minimum candidate joint angle and the joint angle calculation model;

instructions for determining a second candidate arm angle interval of the target joint based on the change information and the second arm angle interval; and instructions for using an intersection of the first candidate arm angle interval and the second candidate arm angle interval as the joint arm angle interval corresponding to the target joint.

10. The robotic arm of claim 9, wherein when the target joint is the first joint, the third joint, the fifth joint, or the seventh joint of the robotic arm, the joint angle calculation model is as an equation of:

$$\tan \theta_i = \frac{a_{ni}\sin\psi + b_{ni}\cos\psi + c_{ni}}{a_{di}\sin\psi + b_{di}\cos\psi + c_{di}};$$

where, $\theta_i$ is the joint angle of the i-th joint, i is one of 1, 3, 5 and 7, $a_{ni}$, $b_{ni}$, $c_{ni}$, $a_{di}$, $b_{di}$ and $c_{di}$ are coefficients in the joint angle calculation model that corresponds to the i-th joint, and $\psi$ is the arm angle; and when the target joint is the second joint or the sixth joint of the robotic arm, the joint angle calculation model is as an equation of:

$$\sin \theta_j = a_j \sin \psi + b_j \cos \psi + c_j;$$

where $\theta_j$ is the joint angle of the j-th joint, j is one of 2 and 6, $a_j$, $b_j$ and $c_j$ are coefficients in the joint angle calculation model that correspond to the j-th joint, and $\psi$ is the arm angle.

11. The robotic arm of claim 10, wherein when the target joint is the first joint, the third joint, the fifth joint, or the seventh joint of the robotic arm, the differential relationship model is as an equation of:

$$f_i(\psi) = \frac{d\theta_i}{d\psi} = \frac{a_{ti}\sin\psi + b_{ti}\cos\psi + c_{ti}}{f_{ni}^2(\psi) + f_{di}^2(\psi)};$$

where, $\theta_i$ is the joint angle of the i-th joint, i is one of 1, 3, 5 and 7, $a_{ti}$, $b_{ti}$ and $c_{ti}$ are coefficients in the differential relationship model that correspond to the i-th joint, and $\psi$ is the arm angle, $a_{ti}=b_{di}\times c_{ni}-b_{ni}\times c_{di}$, $b_{ti}=a_{ni}\times c_{di}-a_{di}\times c_{ni}$, $c_{ti}=a_{ni}\times b_{di}-a_{di}\times b_{ni}$, $f_{ni}(\psi)=a_{ni}\sin\psi+b_{ni}\cos\psi+c_{ni}$, $f_{di}(\psi)=a_{di}\sin\psi+b_{di}\cos\psi+c_{di}$; and when the target joint is the second joint or the sixth joint of the robotic arm, the differential relationship model is as an equation of:

$$f_j(\psi) = \frac{d\theta_j}{d\psi} = \frac{1}{\cos\theta_j}(a_j\cos\psi - b_j\sin\psi);$$

where $\theta_j$ is the joint angle of the j-th joint, j is one of 2 and 6, $a_j$, $b_j$ and $c_j$ are coefficients in the joint angle calculation model that correspond to the j-th joint, and $\psi$ is the arm angle.

12. The robotic arm of claim 9, wherein the instructions for obtaining the change information of the joint angle of the target joint with the arm angle based on the rule determination model comprise:

instructions for determining the change information of the joint angle of the target joint with the arm angle as the periodic change information, in response to $$F = a_{ti}^2 + b_{ti}^2 - c_{ti}^2$$

being larger than 0; and instructions for determining the change information of the joint angle of the target joint with the arm angle as the monotonic change information, in response to $$F = a_{ti}^2 + b_{ti}^2 - c_{ti}^2$$

being less than or equal to 0.

13. The robotic arm of claim 9, wherein when the joint angle of the target joint changes periodically and the maximum candidate joint angle is larger than a preset first maximum reference joint angle of the target joint, the instructions for determining the first candidate arm angle interval of the target joint based on the change information and the first arm angle interval comprise:

instructions for determining a size relationship between the maximum candidate joint angle and the minimum candidate joint angle, and a size relationship between a first joint angle corresponding to each arm angle in the first arm angle interval and the first maximum reference joint angle;

instructions for using an open set of the first arm angle interval as the first candidate arm angle interval in response to the maximum candidate joint angle being less than the minimum candidate joint angle and there being at least one first joint angle larger than the first maximum reference joint angle, wherein the open set of the first arm angle interval includes a first set and a second set, the first set includes an arm angle set from a preset first minimum value to a lower limit value of the first arm angle interval, and the second set includes an arm angle set from an upper limit value of the first arm angle interval to a preset first maximum value;

instructions for using the first arm angle interval as the first candidate arm angle interval, in response to the maximum candidate joint angle being less than the minimum candidate joint angle, and the first joint angle being less than or equal to the first maximum reference joint angle;

instructions for using the first arm angle interval as the first candidate arm angle interval, in response to the maximum candidate joint angle being larger than or equal to the minimum candidate joint angle and there being at least one first joint angle larger than the first maximum reference joint angle; and instructions for using the open set of the first arm angle interval as the first candidate arm angle interval, in response to the maximum candidate joint angle being larger than or equal to the minimum candidate joint angle, and the first joint angle being smaller than or equal to the first maximum reference joint angle, wherein the open set of the first arm angle interval includes a third set and a fourth set, the third set includes an arm angle set from a preset second minimum value to the lower limit value of the first arm angle interval, and the fourth set includes an arm angle set from the upper limit value of the first arm angle interval to a preset second maximum value.

14. The robotic arm of claim 9, wherein when the joint angle of the target joint changes monotonically, the instructions for determining the first candidate arm angle interval of the target joint based on the change information and the first arm angle interval comprise:

instructions for determining a monotonic characteristic of the joint angle of the target joint based on the differential relationship model, wherein the monotonic characteristic includes at least one of monotonic increase and monotonic decrease;
instructions for obtaining the first target joint angle based on a second joint angle corresponding to each arm angle in the first arm angle interval, in response to the joint angle of the target joint having the monotonic characteristic of monotonic increase, wherein the first target joint angle being the second joint angle having the smallest difference from a preset second maximum reference joint angle;
instructions for obtaining a candidate upper limit value of the first candidate arm angle interval based on an arm angle corresponding to the first target joint angle;
instructions for obtaining the first candidate arm angle interval based on the candidate upper limit value and the lower limit value of the first arm angle interval;
instructions for obtaining a second target joint angle based on a third joint angle corresponding to each arm angle in the first arm angle interval, in response to the joint angle of the target joint having the monotonic characteristic of monotonic decrease, wherein the second target joint angle being the third joint angle having the smallest difference from a preset smallest reference joint angle;
instructions for obtaining a candidate lower limit value of the first candidate arm angle interval based on an arm angle corresponding to the second target joint angle; and
instructions for obtaining the first candidate arm angle interval based on the candidate lower limit value and an upper limit value of the first arm angle interval.

15. The robotic arm of claim 9, wherein the one or more computer programs further comprise:
instructions for determining whether arm angles in the first candidate arm angle interval meet a preset requirement, wherein the arm angle that meets the preset requirement includes the arm angle within a first position limited interval when the joint angle of the target joint changes periodically, and the arm angle within a second position limited interval when the joint angle of the target joint changes monotonically; and
instructions for obtaining the first candidate arm angle interval after removing the arm angle that meets the preset requirement by removing the arm angle that meet the preset requirement in the first candidate arm angle interval, in response to there being the arm angle that meets the preset requirement in the first candidate arm angle interval;
wherein the instructions for using the intersection of the first candidate arm angle interval and the second candidate arm angle interval as the joint arm angle interval corresponding to the target joint comprise:
instructions for taking the intersection of the first candidate arm angle interval after removing the arm angle that meets the preset requirement and the second candidate arm angle interval as the joint arm angle interval corresponding to the target joint.

16. The robotic arm of claim 9, wherein the instructions for obtaining the target arm angle interval corresponding to the robotic arm based on the joint arm angle interval corresponding to the target joint of the robotic arm comprise:
instructions for taking the intersection of the joint arm angle intervals corresponding to the target joints of the robotic arm as the target arm angle interval corresponding to the robotic arm.

17. A non-transitory computer-readable storage medium for storing one or more computer programs that, when executed by a processor, cause the processor to perform an inverse solving method for an arm angle interval of a seven-degree-of-freedom robotic arm having an elbow joint with offset, wherein the method comprises:
obtaining a joint angle calculation model and a differential relationship model of a target joint of the robotic arm, wherein the target joint is any joint of the robotic arm except the elbow joint; the joint angle calculation model represents a first relationship between a joint angle and arm angle of the target joint, the differential relationship model represents a second relationship between the joint angle and the arm angle of the target joint; and the arm angle of the target joint is an included angle between a plane formed by each joint of the robotic arm and a reference plane;
obtaining extreme arm angles corresponding to a joint angle of the differential relationship model at extreme values based on the differential relationship model, wherein the extreme arm angles include an arm angle corresponding to the joint angle of the differential relationship model at a maximum value and an arm angle corresponding to the joint angle of the differential relationship model at a minimum value;
obtaining a joint arm angle interval corresponding to the target joint based on the extreme arm angle and the joint angle calculation model; and
obtaining a target arm angle interval for controlling the robotic arm to move based on the joint arm angle interval corresponding to the target joint of the robotic arm;
wherein obtaining the joint arm angle interval corresponding to the target joint based on the extreme arm angle and the joint angle calculation model comprises:
obtaining a candidate joint angle of the target joint based on the extreme arm angle and the joint angle calculation model, wherein the candidate joint angle includes a maximum candidate joint angle and a minimum candidate joint angle; and
obtaining a joint arm angle interval corresponding to the target joint based on the candidate joint angle and the joint angle calculation model; and
wherein when the target joint is the first joint, the third joint, the fifth joint, or the seventh joint of the robotic arm, obtaining the joint arm angle interval corresponding to the target joint based on the candidate joint angle and the joint angle calculation model comprises:
obtaining change information of the joint angle of the target joint with the arm angle based on a rule determination model, wherein the rule determination model is $$F = a_{ti}^2 + b_{ti}^2 - c_{ti}^2,$$

and the change information includes at least one of periodic change information and monotonic change information;
calculating a first arm angle interval corresponding to the maximum candidate joint angle based on the maximum candidate joint angle and the joint angle calculation model;
determining a first candidate arm angle interval of the target joint based on the change information and the first arm angle interval;

calculating a second arm angle interval corresponding to the minimum candidate joint angle based on the minimum candidate joint angle and the joint angle calculation model;

determining a second candidate arm angle interval of the target joint based on the change information and the second arm angle interval; and using an intersection of the first candidate arm angle interval and the second candidate arm angle interval as the joint arm angle interval corresponding to the target joint.

18. The non-transitory computer-readable storage medium of claim 17, wherein when the joint angle of the target joint changes periodically and the maximum candidate joint angle is larger than a preset first maximum reference joint angle of the target joint, determining the first candidate arm angle interval of the target joint based on the change information and the first arm angle interval comprises:

determining a size relationship between the maximum candidate joint angle and the minimum candidate joint angle, and a size relationship between a first joint angle corresponding to each arm angle in the first arm angle interval and the first maximum reference joint angle;

using an open set of the first arm angle interval as the first candidate arm angle interval in response to the maximum candidate joint angle being less than the minimum candidate joint angle and there being at least one first joint angle larger than the first maximum reference joint angle, wherein the open set of the first arm angle interval includes a first set and a second set, the first set includes an arm angle set from a preset first minimum value to a lower limit value of the first arm angle interval, and the second set includes an arm angle set from an upper limit value of the first arm angle interval to a preset first maximum value;

using the first arm angle interval as the first candidate arm angle interval, in response to the maximum candidate joint angle being less than the minimum candidate joint angle, and the first joint angle being less than or equal to the first maximum reference joint angle;

using the first arm angle interval as the first candidate arm angle interval, in response to the maximum candidate joint angle being larger than or equal to the minimum candidate joint angle and there being at least one first joint angle larger than the first maximum reference joint angle; and using the open set of the first arm angle interval as the first candidate arm angle interval, in response to the maximum candidate joint angle being larger than or equal to the minimum candidate joint angle, and the first joint angle being smaller than or equal to the first maximum reference joint angle, wherein the open set of the first arm angle interval includes a third set and a fourth set, the third set includes an arm angle set from a preset second minimum value to the lower limit value of the first arm angle interval, and the fourth set includes an arm angle set from the upper limit value of the first arm angle interval to a preset second maximum value.

19. The non-transitory computer-readable storage medium of claim 17, wherein when the joint angle of the target joint changes monotonically, determining the first candidate arm angle interval of the target joint based on the change information and the first arm angle interval comprises:

determining a monotonic characteristic of the joint angle of the target joint based on the differential relationship model, wherein the monotonic characteristic includes at least one of monotonic increase and monotonic decrease;

obtaining the first target joint angle based on a second joint angle corresponding to each arm angle in the first arm angle interval, in response to the joint angle of the target joint having the monotonic characteristic of monotonic increase, wherein the first target joint angle being the second joint angle having the smallest difference from a preset second maximum reference joint angle;

obtaining a candidate upper limit value of the first candidate arm angle interval based on an arm angle corresponding to the first target joint angle;

obtaining the first candidate arm angle interval based on the candidate upper limit value and the lower limit value of the first arm angle interval;

obtaining a second target joint angle based on a third joint angle corresponding to each arm angle in the first arm angle interval, in response to the joint angle of the target joint having the monotonic characteristic of monotonic decrease, wherein the second target joint angle being the third joint angle having the smallest difference from a preset smallest reference joint angle;

obtaining a candidate lower limit value of the first candidate arm angle interval based on an arm angle corresponding to the second target joint angle; and obtaining the first candidate arm angle interval based on the candidate lower limit value and an upper limit value of the first arm angle interval.

20. The non-transitory computer-readable storage medium of claim 17, wherein after determining the first candidate arm angle interval of the target joint based on the change information and the first arm angle interval, the method further comprises:

determining whether arm angles in the first candidate arm angle interval meet a preset requirement, wherein the arm angle that meets the preset requirement includes the arm angle within a first position limited interval when the joint angle of the target joint changes periodically, and the arm angle within a second position limited interval when the joint angle of the target joint changes monotonically; and obtaining the first candidate arm angle interval after removing the arm angle that meets the preset requirement by removing the arm angle that meet the preset requirement in the first candidate arm angle interval, in response to there being the arm angle that meets the preset requirement in the first candidate arm angle interval;

wherein using the intersection of the first candidate arm angle interval and the second candidate arm angle interval as the joint arm angle interval corresponding to the target joint comprises:

taking the intersection of the first candidate arm angle interval after removing the arm angle that meets the preset requirement and the second candidate arm angle interval as the joint arm angle interval corresponding to the target joint.

* * * * *